United States Patent
Saiwan et al.

(10) Patent No.: US 9,155,998 B2
(45) Date of Patent: Oct. 13, 2015

(54) REACTIVE EXTRACTION PROCESS FOR REGENERATION OF AMINE-BASED SOLVENTS USED FOR CARBON DIOXIDE CAPTURE

(75) Inventors: Chintana Saiwan, Bangkok (TH); Phattara Akkarachalanont, Bangkok (TH); Teeradet Supap, Regina (CA); Raphael Idem, Regina (CA); Paitoon Tontiwachwuthikul, Regina (CA)

(73) Assignee: University of Regina, Regina, Saskatchewan (CA)

( * ) Notice: Subject to any disclaimer, the term of this patent is extended or adjusted under 35 U.S.C. 154(b) by 100 days.

(21) Appl. No.: 13/980,771

(22) PCT Filed: Jan. 19, 2012

(86) PCT No.: PCT/CA2012/000063
§ 371 (c)(1), (2), (4) Date: Dec. 3, 2013

(87) PCT Pub. No.: WO2012/097449
PCT Pub. Date: Jul. 26, 2012

(65) Prior Publication Data
US 2014/0094360 A1    Apr. 3, 2014

Related U.S. Application Data

(60) Provisional application No. 61/434,082, filed on Jan. 19, 2011.

(51) Int. Cl.
*B01J 33/00* (2006.01)
*B01J 37/30* (2006.01)
(Continued)

(52) U.S. Cl.
CPC ............ *B01D 53/73* (2013.01); *B01D 53/1425* (2013.01); *B01D 53/1475* (2013.01);
(Continued)

(58) Field of Classification Search
USPC .............................. 502/1, 11, 20, 22
See application file for complete search history.

(56) References Cited

U.S. PATENT DOCUMENTS

| 4,970,334 A * | 11/1990 | Argyropoulos et al. ...... 560/261 |
| 2004/0020361 A1 * | 2/2004 | Pellegrin ........................ 95/150 |

(Continued)

OTHER PUBLICATIONS

International Search Report and Written Opinion issued in International Patent Application No. PCT/CA2012/000063, dated Mar. 13, 2012.

(Continued)

*Primary Examiner* — James McDonough
(74) *Attorney, Agent, or Firm* — Parker Highlander PLLC

(57) ABSTRACT

A method for recovery of impurities and/or degradation products and/or heat-stable salts from amine-based solvents used for capture of $CO_2$ from gas streams. The method comprises recovering $CO_2$ from a $CO_2$-enriched amine-based solvent thereby producing a lean amine-based solvent, contacting and mixing together the lean amine-based solvent with a reaction composition comprising a phase-change catalyst and a diluent, thereby producing a first organic phase comprising the impurities and/or degradation products and/or heat-stable salts and a first aqueous phase comprising the lean amine-based solvent, separating the first organic phase and the first aqueous phase; and separately recovering the first organic phase and the first aqueous phase. The organic phase can be regenerated by intermixing with a NaOH solution to form an organic phase comprising therein the reaction composition and and an aqueous phase comprising the NaOH solution with the impurities and/or degradation products and/or heat-stable salts.

19 Claims, 20 Drawing Sheets

(51) Int. Cl.
  *B01J 20/34* (2006.01)
  *B01D 53/73* (2006.01)
  *B01D 53/14* (2006.01)
  *B01D 53/62* (2006.01)
  *B01D 53/96* (2006.01)
  *B01J 31/02* (2006.01)

(52) U.S. Cl.
  CPC .......... *B01D53/1493* (2013.01); *B01D 53/62* (2013.01); *B01D 53/96* (2013.01); *B01J 31/0237* (2013.01); *B01J 31/0271* (2013.01); *B01D 2252/20405* (2013.01); *B01D 2252/20421* (2013.01); *B01D 2252/20484* (2013.01); *B01D 2257/504* (2013.01); *Y02C 10/04* (2013.01); *Y02C 10/06* (2013.01)

(56) References Cited

U.S. PATENT DOCUMENTS

| | | | |
|---|---|---|---|
| 2007/0213415 A1* | 9/2007 | Sarlis | 521/27 |
| 2008/0127831 A1* | 6/2008 | Rochelle et al. | 96/181 |
| 2010/0086983 A1* | 4/2010 | Gellett et al. | 435/168 |
| 2011/0116997 A1* | 5/2011 | Attalla et al. | 423/228 |
| 2014/0186119 A1* | 7/2014 | Dusseault et al. | 405/129.2 |

OTHER PUBLICATIONS

Extended European Search Report issued in dEuropean Patent Application No. 12737037.7, dated Nov. 27, 2014.
Keshav, Amit et al., Extraction of Propionic Acid Using Different Extratancts (Tri-n-butylphosphate, Tri-n-octylamine, and Aliquat 336), Ind., Eng., Chem. Res. 2008, 47, 6192-6196.

* cited by examiner

REACTIVE EXTRACTION PROCESS FOR REGENERATION OF AMINE-BASED SOLVENTS USED FOR CARBON DIOXIDE CAPTURE

This Application is a National Stage of co-pending International Application No. PCT/CA2012/00063 filed Jan. 19, 2012, which claims benefit of U.S. Provisional Patent Application No. 61/434,082 filed Jan. 19, 2011, the contents of both of which are herein incorporated in their entirety by reference.

TECHNICAL FIELD

The present invention relates to processes for removing impurities and/or degradation products and/or heat stable salts (HSS) from amine-based solvent streams used for removing $CO_2$ from gas streams. In particular, the present invention relates to reactive extraction processes for removing impurities and/or degradation products and/or heat stable salts (HSS) from amine-based liquid absorbents. The present invention also relates to regeneration and recycling of the reactive extractant.

BACKGROUND

Amine-based solvent solutions are commonly used for absorption of carbon dioxide ($CO_2$) from low-pressure flue gas streams produced as a consequence of industrial combustion processes. Examples of effective amines commonly used include monoethanolamine (MEA), diethanolamine (DEA), and methyldiethanolamine (MDEA). However, while amines are effective for $CO_2$ capture and removal from gas streams, they are degraded and lose their efficacy by irreversible reactions with flue gas impurities (e.g. $O_2$, $SO_2$, and CO). Consequently, the degraded amines need to be continually replaced to maintain efficient $CO_2$ capture and removal, resulting in increased costs to operate and manage industrial combustion processes. The flue gas impurities may also react with various amines to form heat-stable salts (HSS). The HSS species are corrosive and are typically generated by reactions of amines with oxidizing agents to form short-chain carboxylic acids. These acids subsequently quickly bond with amines to form stable salts. Not only do HSS have no capacity to absorb $CO_2$, their presence in solvent solutions make it difficult to regenerate the solvents, at least under typical processing conditions used to regenerate and recycle amine solvent solutions used in $CO_2$-capture systems.

Some conventional amine-based solvent solutions regenerating systems use distillation to separate the amines from the HSS contaminants. Since distillation is achieved based on boiling point differences, a large energy input is required to separate the amines and water from the HSS. This makes distillation a very energy-demanding process, which gives rise to high operating costs. In addition, co-evaporation commonly occurs since various HSS and degradation products may have boiling points close to those of the amines. As a result, the amine solvent solutions may still be contaminated by HSS after distillation.

SUMMARY

The present disclosure pertains to separation and recovery of impurities and/or degradation products and/or heat-stable salts from spent amine-based solvent systems used for capturing and removing $CO_2$ from gas streams, after the $CO_2$ has been recovered from the amine-based solvent systems.

Some exemplary embodiments of the present disclosure pertain to reaction compositions formulated to recover impurities, degradation products and heat-stable salts from spent lean amine solvent solutions. The exemplary reaction composition comprise mixtures of a phase-change catalyst and a diluent. Suitable phase-change catalysts are exemplified by tri-n-octylamine and by Aliquat® 336 chemically modified to replace a portion of its chloride ions with hydroxyl ions. Suitable diluents are exemplified by 1-octylamine.

Some exemplary embodiments of the present disclosure pertain to a one-stage method for separating and recovering impurities and/or degradation products and/or heat-stable salts from spent amine-based solvent systems used for capturing and removing $CO_2$ from gas streams, after the $CO_2$ has been recovered from the amine-based solvent systems.

Some exemplary embodiments pertain to a two-stage method for separating and recovering impurities and/or degradation products and/or heat-stable salts from spent amine-based solvent systems used for capturing and removing $CO_2$ from gas streams, after the $CO_2$ has been recovered from the amine-based solvent systems.

BRIEF DESCRIPTION OF THE DRAWINGS

The present invention will be described in conjunction with reference to the following drawings, in which.

DETAILED DESCRIPTION

Figure 1:
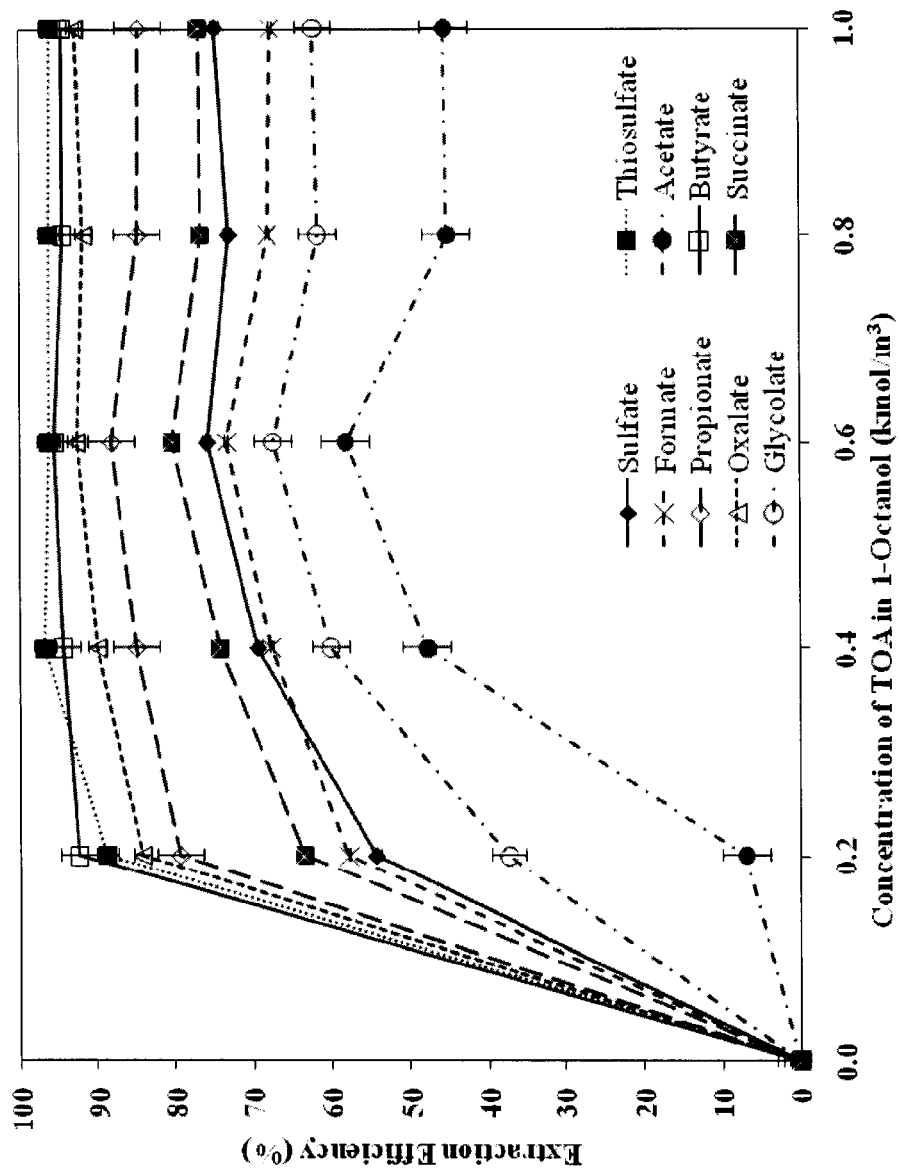
FIG. 1 is a chart showing the effects of TOA in 1-octanol on the efficiency of HSS extraction from water.

The present invention relates to reaction compositions, methods and systems for removing impurities and/or degradation products and/or heat-stable salts (HSS) from amine-based solvent systems commonly used for capturing and removing $CO_2$ from gas streams. Suitable exemplary amines for the amine-based solvent systems include monoethanolamine (MEA), diethanolamine (DEA), and methyldiethanolamine (MDEA), 2-amino-2-methyl-1-propanol (AMP), piperazine (PZ), and the like. Exemplary impurities, degradation products and HSS that can be recovered according to the embodiments of the present invention are exemplified by $O_2$, CO, $SO_2$, $SO_3$, $SO_4$, $S_2O_4$, imidazole, 2-oxazolidone, N-(2-hydroxyethyl) succinimide, N-(2-hydroxyethyl)acetamide, 1-(2-hydroxyethyl)-2-imidazolidinone, formate, acetate, propionate, butyrate, oxalate, succinate, glycolate, and the like.

According to an exemplary embodiment of the present invention, a suitable reaction composition for reacting with and recovery of impurities and/or degradation products and/or HSS commonly found in amine-based solvent systems comprises a phase transfer catalyst and a suitable diluent comprising a straight-chain fatty alcohol. Suitable phase transfer catalysts are exemplified by tri-n-octylamine (TOA) and chemically modified Aliquat® 336 (Aliquat® is a registered trademark of Cognis IP Management GMBH, Duesseldorf, Fed. Rep. Germany) wherein the chemical modification is substitution of the Cl⁻ ions with OH⁻ ions. Those skilled in these arts will understand that the IUPAC name for Aliquat® 336 is N-Methyl-N,N-dioctyloctan-1-ammonium chloride. Aliquat® 336 is also commonly referred to as tricaprylmethylammonium chloride and methyltrioctylammonium chloride. A suitable straight-chain fatty acid alcohol diluent is exemplified by 1-octanol.

According to one aspect, an exemplary reaction composition comprises TOA diluted in 1-octanol to a final TOA concentration from the range of about 0.01 kmol/m³ to about 1.5 kmol/m³, from the range of about 0.2 kmol/m³ to about 1.0 kmol/m³, from the range of about 0.4 kmol/m³ to about 0.8 kmol/m³. An exemplary preferred reaction composition comprises TOA diluted in 1-octanol to a final TOA concentration of about 0.6 kmol/m³.

According to another aspect, an exemplary reaction composition comprises a chemically modified Aliquat® 336 diluted in 1-octanol to a final concentration from the range of about 0.01 kmol/m³ to about 1.5 kmol/m³, from the range of about 0.2 kmol/m³ to about 1.3 kmol/m³, from the range of about 0.4 kmol/m³ to about 1.1 kmol/m³. A preferred reaction composition comprises a chemically modified Aliquat® 336 diluted in 1-octanol to a final concentration of about 1.0 kmol/m³. The Aliquat® 336 is chemically modified by replacing from about 49% to about 95% of the ions with OH⁻ ions, from about 59% to about 89% of the Cl⁻ ions with OH⁻ ions, from about 69% to about 79% of the Cl⁻ ions with OH⁻ ions. An exemplary preferred reaction composition comprises Aliquat® 336 having about 69% of the Cl⁻ ions replaced with OH⁻ ions, and diluted in 1-octanol to a final concentration of about 1.0 kmol/m³.

An exemplary one-stage method of the present invention for removing impurities and/or degradation products and/or heat-stable salts (HSS) from amine-based solvent systems used for capturing and removing $CO_2$ from gas streams, generally comprises the steps of:
  recovering $CO_2$ from a $CO_2$-enriched amine-based solvent thereby producing a lean amine-based solvent;
  contacting and mixing together the lean amine-based solvent with the reaction composition of the present invention to produce an organic phase and an aqueous phase;
  allowing the organic phase to separate from the aqueous phase whereby the impurities and/or degradation products and/or HSS are separated into organic phase and the lean amine-based solvent is separated into the aqueous phase;
  separately recovering the organic phase and the aqueous phase;
  optionally regenerating the purified lean amine-based solvent recovered in the aqueous phase; and
  optionally regenerating the reaction composition recovered in the organic phase.

In this one-stage method, it is optional for the ratio of the organic phase (i.e., reaction composition) to the aqueous phase (i.e., the lean amine-based solvent) to be one of 1-to-1, or alternatively 1:2 or more, or alternatively 2:1 or more. An exemplary preferred ratio of organic phase to aqueous phase is about 1-to-1.

According to another embodiment of the present invention, a two-stage method of the present invention for removing impurities and/or degradation products and/or heat-stable salts (HSS) from amine-based solvent systems used for capturing and removing $CO_2$ from gas streams, generally comprises:
  recovering $CO_2$ from a $CO_2$-enriched amine-based solvent thereby producing a lean amine-based solvent;
  in a first step, contacting and mixing together the lean amine-based solvent with a first reaction composition comprising Aliquat® 336 chemically modified by replacement of a portion of the Cl⁻ ions with OH⁻ ions and diluted in 1-octanol, to produce a first organic phase comprising the impurities and/or degradation products and/or HSS and a first aqueous phase comprising the lean amine-based solvent;
  allowing the first organic phase to separate from the first aqueous phase;
  separately recovering the first organic phase and the first aqueous phase;
  in a second step, contacting and mixing together the lean amine-based solvent recovered in the first aqueous phase with a second reaction composition comprising TOA diluted in 1-octanol to produce a second organic phase comprising the impurities and/or degradation products and/or HSS and a second aqueous phase comprising the lean amine-based solvent;

allowing the second organic phase to separate from the second aqueous phase;

separately recovering the second organic phase and the second aqueous phase;

optionally regenerating the purified lean amine-based solvent recovered in the second aqueous phase;

optionally regenerating the reaction composition recovered in the first organic phase; and optionally regenerating the reaction composition recovered in the second organic phase.

In this two-stage method, it is optional for the ratio of the first organic phase (i.e., reaction composition) to the first aqueous phase (i.e., the lean amine-based solvent), and for the ratio of the second organic phase to the second aqueous phase, to be one of 1-to-1, or alternatively 1:2 or more, or alternatively 2:1 or more. An exemplary preferred ratio of: (i) the first organic phase to the first aqueous phase is about 1-to-1, and (ii) the second organic phase to the second aqueous phase is about 1-to-1.

The present invention also pertains to methods and systems for regenerating used and/or spent reaction compositions, i.e., reaction compositions that have recovered and contain therein impurities and/or degradation products and/or HSS. According to one exemplary embodiment, a selected volume of an aqueous solution of NaOH is vigorously mixed together with a selected volume of the spent reaction composition at a temperature selected from the range of about 277° K to about 360° K to produce an organic phase comprising a regenerated reaction composition and an aqueous phase comprising the NaOH solution into which the impurities and/or degradation products and/or HSS have been recovered. The organic phase is separated and recovered from the aqueous phase, after which, the organic phase can be recycled for recovery of more impurities and/or degradation products and/or HSS from a lean amine-based solvent stream. Alternatively, the recovered organic phase can be further purified and regenerated by vigorously mixing with a fresh batch of aqueous NaOH solution. A suitable concentration of NaOH for regenerating the spent reaction compositions of the present invention is from the range of about 0.5 kmol/m$^3$ to about 10.0 kmol/m$^3$, from the range of about 1.0 kmol/m$^3$ to about 8.0 kmol/m$^3$, from the range of about 2.0 kmol/m$^3$ to about 6.0 kmol/m$^3$, about 4.0 kmol/m$^3$. It is optional for the ratio of the aqueous NaOH solution to the spent reaction composition to be one of 1-to-1, or alternatively 1-to-2 or more, or alternatively 2-to-1 or more. An exemplary preferred ratio of: (i) the first organic phase to the first aqueous phase is about 1-to-1, and (ii) the second organic phase to the second aqueous phase is about 1-to-1. An exemplary preferred method for regenerating spent reaction composition comprises intermixing the composition with a 4.0 kmol/m$^3$ NaOH solution at about 320° K to about 330° K at a NaOH to spent reaction composition ratio of about 1-to-1.

EXAMPLES

Example 1

1.1: Equipment and Chemicals

The following chemicals were prepared for the organic phases. Tri-n-octylamine (TOA; 98% purity) and Aliquat® 336 were obtained from Sigma-Aldrich Canada Ltd. (Oakville, ON, CA). Reagent-grade 99% pure 1-Octanol (Sigma Aldrich Canada Ltd.) was used as a diluent to prepare the desired TOA and Aliquat® concentrations. Aqueous solutions of sodium hydroxide (NaOH, reagent grade of 97% purity) and potassium hydroxide (KOH, reagent grade of 87% purity) were prepared by dissolving predetermined weights in deionized water, and were used to convert Aliquat® to the hydroxide form (OH$^-$). Mohr's method was adopted as a procedure to determine % OH conversion as the equivalent concentration of replaced by OH. This determination was by titration using 0.1 kmol/m$^3$ silver nitrate (AgNO$_3$) with 0.25 kmol/m$^3$ potassium chromate (K$_2$CrO$_4$) as an indicator. A hydrophobic filter and a rotary evaporator (model RII, BÜCHI Labortechnik AG, Switzerland) with vacuum pump (model 2025, Wisconsin, United States) were used to remove water residue from the converted Aliquat®. A similar grade of NaOH used for conversion experiments was also used in the regeneration experiments except that the concentration used for the latter tests ranged from 1 to 4 kmol/m$^3$.

The following chemicals were prepared for the aqueous phases: Concentrated MEA (>99% purity) was used to prepare a 5 kmol/m$^3$ aqueous MEA solution by diluting a predetermined weight of MEA with deionized water. Some MEA solutions were loaded with CO$_2$ from gas cylinders containing, 100% CO$_2$ cylinder (research grade). The exact MEA concentration (kmol/m$^3$) and CO$_2$ loading (mol CO$_2$/mol MEA) were confirmed respectively by titration with hydrochloric acid (1 kmol/m$^3$ HCl) to methyl orange endpoint, and CO$_2$ displacement in a mixture of sodium chloride (NaCl), sodium bicarbonate (NaHCO$_3$), and methyl orange. Reagent-grade formic acid, acetic acid, propionic acid, butyric acid, glycolic acid, oxalic acid, succinic acid, sodium sulfate, sodium sulfite, sodium thiosulfate were used to prepare simulated degraded MEA solutions containing HSS. Assessments were made of extraction efficiencies from MEA solutions, simulated degraded MEA solutions containing HSS, and HSS solutions. Additionally, 1000 ppm N-(2-hydroxyethyl) acetamide, 1-(2-hydroxyethyl)-2-imidazolidinone (75% in water), imidazole, N-(2-hydroxyethyl)succinimide (95%), and 2-oxazolidone (98%) were spiked into some MEA solutions and used for extraction tests of neutral degraded compounds.

Capillary Electrophoresis (CE) apparatus equipped with diode array detector (DAD) (CE, model HP 3D CE, Hewlett-Packard Canada Ltd., Montreal, Quebec, Canada) was used for aqueous phase analysis of HSS and chloride concentrations. The first CE method used in this study was adopted from the disclosure of Bord et al., (2005, *Simultaneous Determination of Inorganic Anions and Organic Acids in Amine Solutions for Sour Gas Treatment by Capillary Electrophoresis with Indirect UV Detection*, J. Chromatography 1100: 223-229). For all CE analysis, a bare-fused silica capillary column of extended light path (150 μm) with dimensions of 50 μm id×645 mm length (560 mm effective length, Agilent Technologies Canada, Mississauga, Ontario, Canada) was used. For the first CE method, background electrolyte (BGE) was trimellitate-based solution prepared by mixing 0.8406 g of trimellitic (1,2,4-benzenetricarboxylic) acid (≥99% purity), 0.4000 g of polyvinyl alcohol (average molecular weight 30,000-70,000) and 9.6880 g of trizma base (tris(hydroxymethyl)aminomethane (ultrapure grade) with 400 g of nanopure water. All chemicals were purchased from Sigma-Aldrich, Canada. The electrolyte was degassed in an ultrasonic bath (model 75D, VWR International, PA, USA) and filtered through 0.2 μm nylon filter before use. 10% (w/w). Reagent grade hexadimethrine bromide (≥95% purity) was also used for capillary coating. The second CE method used organic acid buffer for CE (pH 5.6, Agilent Technologies Canada, Mississauga, ON, CA) to additionally determine acetate and glycolate when Aliquat® 336 was used in the extraction. CE water (ultra pure), 0.1, and 1 M NaOH solution purchased from Agilent Technology, Canada were also used for capillary flushing. Sodium molybdate ($NaMoO_4$, ≥98% purity) was selected as an internal standard for HSS quantitative analysis. The pH meter used was pH/CON 510 standard model (Oakton, New York, United States) with a precision of ±0.01 pH unit. All CE samples were prepared using in-house nanopure water.

Gas chromatograph-mass spectrometer (GC-MS, model 6890-5073, Hewlett-Packard Canada, Ltd., Montreal, Quebec, Canada) was used to analyze neutral degradation products, i.e. N-(2-hydroxyethyl)acetamide, 1-(2-hydroxyethyl)-2-imidazolidinone, imidazole, N-(2-hydroxyethyl) succinimide, and 2-oxazolidone. Chromatographic capillary column was HP-Innowax having cross-linked polyethylene glycol as a stationary phase. The column had the dimension of 0.25 μm thickness×0.25 mm i.d.×30 m length and was obtained from Agilent Technologies, Canada. The introduction of sample was done by an autosampler/autoinjector (model 7683, Hewlett-Packard Canada, Ltd., Montreal, Quebec, Canada).

1.2: Extraction Procedures

A typical run was carried out in a 40 mL extracting bottle. Ten milliliters of 1000 ppm HSS spiked in 5 $kmol/m^3$ aqueous MEA, or alternatively, into water were loaded into the bottle. In $CO_2$ loaded experiments, 5 $kmol/m^3$ MEA solution was preloaded with the desired $CO_2$ concentration by passing 100% $CO_2$ from its gas cylinder into the solution at a predetermined time before adding HSS. Two milliliters samples were taken and checked for the exact $CO_2$ loading using the $CO_2$ displacement technique as previously disclosed by Supap et al. (2006, *Analysis of Monoethanolamine and Its Oxidative Degradation Products During $CO_2$ Absorption from Flue Gases: a Comparative Study of GC-MS, HPLC-RID, and CE-DAD Analytical Techniques and Possible Optimum Combinations*. Ind. Eng. Chem. Res., 45(8), 2437-2451). For 1 to 1 phase volume ratio (volume ratio of organic extractant phase to aqueous phase), equal volumes of 10 mL of desired extractant phases and aqueous phases were loaded in the extracting bottle. For phase volume 1 to 2 experiments, the volume of extractant phase used was 10 mL while 20 mL of the aqueous phase were added. For phase volume 2 to 1 experiments, the volume of extractant phase used was 20 mL while 10 mL of the aqueous phase were added. Details of extraction conditions used in this study are given in Table 1.

TABLE 1

Extraction conditions

| Extraction Parameter | Range |
| --- | --- |
| TOA concentration | 0-1 $kmol/m^3$ |
| Aliquat ® 336 concentration | 0-1 $kmol/m^3$ |
| OH Aliquat ® concentration | 1 $kmol/m^3$ |
| Volume Phase Ratio | 1 to 1, 1 to 2, and 2 to 1 |
| Temperature | 298° K-338° K |
| Mixing time | 10 min |

A magnetic stirrer regulated at 1200 rpm was used to mix the 2 phases thoroughly at a predetermined time of 10 minutes or as noted. The mixing conditions were sufficient to allow HSS transfer from the aqueous phase to the extractant phase to occur at its maximum. In the case of extraction at room temperature, 2 phases were mixed as they were prepared. For higher temperatures, extractant and aqueous phases were separately brought to the desired temperature in a temperature controlled water bath prior to mixing. The two phases were then mixed and stirred at that temperature in the bath throughout. The mixture was then set to ensure phase equilibration. To completely separate the 2 phases as well as speed up the separation process, the mixture was centrifuged at 4,000 rpm for 8 minutes. The extractant phase on the upper layer was carefully removed and kept at 277° K for regeneration studies. The pH of aqueous phase was measured and then the aqueous phase was analyzed by CE techniques to determine HSS concentrations remaining after extractions were completed. Extractability of extractant was expressed in terms of extraction efficiency of HSS calculated using Eq (1);

$$\% \text{ Extraction efficiency} = \left( \frac{[HSS]_{before} - [HSS]_{after}}{[HSS]_{before}} \right) \times 100 \quad (1)$$

Where $[HSS]_{before}$ and $[HSS]_{after}$ denote ppm concentration of HSS before and after extraction in aqueous MEA or water.

Similar procedures were applied for the extraction of neutral degradation products (i.e. N-(2-hydroxyethyl)acetamide, 1-(2-hydroxyethyl)-2-imidazolidinone, imidazole, N-(2-hydroxyethyl) succinimide, and 2-oxazolidone) in 5 $kmol/m^3$ MEA solution. The only difference was that the GC-MS technique was used to analyze concentrations of these products before and after extraction in aqueous MEA phase.

1.3: Chemical Modification of Aliquat® 336

Modification of Aliquat® 336 to the $OH^-$ form was initially carried out following the procedure disclosed by Reisinger et al. (1995, *Extraction and Sorption of Acetic Acid at pH above pKa To Form Calcium Magnesium Acetate*. Ind. Eng. Chem. Res., 34, 845-852.) for replacing the chloride ion ($Cl^-$) of Aliquat® 336 with the $OH^-$ ion. Exactly 2 $kmol/m^3$ KOH was mixed into a 250 mL flask using 105 mL equivalent in volume to Aliquat® 336 (1 to 1 phase volume ratio of Aliquat® 336 and KOH). The bottle was shaken vigorously for 5 minutes at room temperature to allow maximum ion exchange between $Cl^-$ and $OH^-$ to occur. The mixture was set for phase separation. The upper layer phase of Aliquat® was removed and contacted again with freshly prepared KOH using the same steps just described. The procedures were then repeated for a total of 10 contact times. Residual water was then removed from the final Aliquat® by filtration through a hydrophobic filter. The degree of conversion (% OH in Aliquat®) was measured by analyzing the concentration that remained in the converted Aliquat® using Mohr's method. The difference of $Cl^-$ concentration in the original Aliquat® and that of after conversion equivalent to $OH^-$ concentration in the modified Aliquat® structure was determined as 69%.

Attempts were made to increase the % OH in Aliquat® as it might increase the extraction efficiency. NaOH was used instead of KOH. Approximately 4 $kmol/m^3$ NaOH was used for conversion. The mixing temperature was raised from room temperature to 313° K by preheating NaOH and Aliquat® 336 prior to mixing. Mixing time was also increased from 5 to 10 minutes. The Aliquat® was repeatedly contacted with fresh NaOH for 15 contact times. The only parameter kept similar to the first conversion was the Aliquat® to NaOH volume ratio of 1 to 1. The rest of the procedure kept the same. Using Mohr's analysis, it was determined that the second conversion successfully increased the degree of conversion to 79%. Stronger conditions were further used to convert more of $Cl^-$ to $OH^-$. With 5 $kmol/m^3$ NaOH, 333° K temperature, 10 min mixing time, 15 contact times, and 1 to 2 volume ratio of Aliquot® and NaOH, the degree of conversion obtained was 87% for the third conversion. The final conversion of 88% was also obtained and carried out using similar NaOH concentration, temperature, and mixing time as used in the third conversion. The only difference was contact time and volume ratio selected at 21 and 1 to 1, respectively. A vacuum-rotary evaporator set at 150 mmHg and 353° K was used to remove water residue from the third and the fourth converted Aliquat®. The conversion conditions are summarized in Table 2.

TABLE 2

Conditions used to chemically modify Aliquat ® 360

| Chemical | Contact time | Volume Phase ratio | Temperature (° K) | Mixing time (min) | Degree of OH Conversion (%, ±2) |
|---|---|---|---|---|---|
| 2 kmol/m$^3$ KOH | 10 | 1 to 1 | 298 | 5 | 69 |
| 2 kmol/m$^3$ NaOH | 15 | 1 to 1 | 313 | 10 | 79 |
| 3 kmol/m$^3$ NaOH | 15 | 1 to 2 | 333 | 10 | 87 |
| 4 kmol/m$^3$ NaOH | 21 | 1 to 1 | 333 | 10 | 88 |

1.4: Regeneration Procedures

Aliquat® in 1-octanol samples preloaded with HSS were loaded into 40-mL bottles. A NaOH solution having a selected concentration (i.e. 1 and 4 kmol/m$^3$) was then added to each bottle. The volume of organic phase and NaOH solution used was determined by the selected phase ratio of Aliquat® to NaOH, i.e., 1 to 2, 1 to 1, and 2 to 1. The 2 phases were mixed using magnetic stirrer with conditions previously described in Example 1. The mixing times however were varied from 5 to 10 minutes. Mixing was carried out outside the temperature controlled bath for room temperature runs. Similar procedures were used for extraction was used for higher temperature experiments (i.e. 313° K and 323° K). The mixtures were then left to equilibrate after which, the 2 phases were separated by centrifugation at 4,000 rpm for 8 min. The organic layer comprising Aliquat® was removed from the bottle. The amount of HSS removed from Aliquat® was directly analyzed from the bottom phase of aqueous NaOH by CE technique. The regeneration efficiency determined using Eq (2) is given as follows;

$$\% \text{ Regeneration efficiency} = \left( \frac{[HSS]_{in\ NaOH\ after\ regeneration}}{[HSS]_{in\ Aliquat\ before\ regeneration}} \right) \times 100 \quad (2)$$

1.5: Analysis of HSS Using Capillary Electrophoresis Technique (CE)

Two CE methods were used to analyze HSS concentration in all aqueous phase in this study (i.e. HSS in MEA and water with TOA and OH Aliquat® extraction, KOH, and NaOH). The first CE method adopted from the disclosure of Bord et al., (2005) was used to directly determine formate, propionate, butyrate, oxalate, succinate, sulfite, sulfate, and thiosulfate. This method was also used to directly analyze partially overlapped acetate and glycolate in TOA and OH Aliquat® extractions. Original Aliquat® 336; however, caused almost 100% overlap of acetate and glycolate peaks after extraction making their quantitative analysis with this CE method impossible. The second CE method described previously was required for analysis of both HSS. Prior to sample analysis, the capillary was preconditioned by initially flushing with 1 kmol/m$^3$ NaOH for 20 minutes followed by 10% hexadimethrine bromide solution for 20 minutes. 0.1 kmol/m$^3$ NaOH was subsequently flushed for 10 minutes to remove excess bromide left by the previous step. CE water was used to flush for additional 10 minutes. The capillary was then flushed with trimellitate-based BGE for 20 minutes. Voltage of −30 kV was finally applied for 10 minutes to complete the preconditioning process. For an actual analysis, a sample was injected using hydrodynamic mode in which 50 mbar was applied in the sample vial for 8 seconds. Negative voltage of 30 kV was applied throughout the run for 10 minutes. HSS was detected using indirect UV detection mode set at 350 nm with a bandwidth of 80 nm with a reference of 240 nm with a 10 nm bandwidth. The capillary was kept at 298° K, also throughout the analysis. In between runs, the capillary was flushed with BGE for 5 minutes. Since the aqueous phase was only analyzed for HSS concentration, a material balance was used to determine HSS concentration in the extractant phase.

For the second CE method, the same capillary was initially prepared by flushing for 15 minutes with a ready-made organic acid buffer of pH 5.6 BGE. Hydrodynamic mode of sample introduction was still used by applying pressure of 50 mbar for 2 and 4 seconds to sample and BGE vials, respectively. Negative voltage of 25 kV was applied while the capillary column was kept at 293° K throughout the analysis. DAD signal set at 350 nm with a bandwidth of 20 nm with reference of 200 nm with a bandwidth of 10 nm was used for HSS detection. The capillary was flushed for 4 minutes with BGE in between analysis. The analysis time was also 10 minutes.

1.6: Quantitative Analysis of HSS

Quantitative analysis of HSS was obtained using internal standard calibration curves. Prior to sample analysis, stock solution of standard 100 ppm formate, acetate, propionate, butyrate, glycolate, succinate, oxalate, sulfite, sulfate, and thiosulfate was prepared in 0.5 kmol/m$^3$ MEA solution. The stock solution was carefully diluted to 10, 20, 30, 40, 50, and 75 ppm using predetermined volume of 0.5 kmol/m$^3$ MEA. Each standard including 100 ppm stock was then spiked with 200 ppm molybdate internal standard and run using the first CE condition described earlier. All standards were analyzed 3 times to check for repeatability. Standard curves were all generated by plotting averaged corrected peak area ratios of standard HSS and molybdate against corresponding HSS concentrations. For sample extracted by TOA and OH Aliquat®, all HSS in aqueous phase were analyzed by these area-concentration curves, except acetate and glycolate whose analysis was done using additional curves made by height ratio. Standard area-concentration curves of acetate and glycolate were only used for samples from Aliquat® 336 extraction. Extraction samples were prepared by diluting with nanopure water using a dilution ratio of 1 in 10 and later spiked with 200 ppm molybdate. This ratio was selected so that the MEA concentration in the diluted sample remained the same as that of the standards. Injections were done twice and the area ratios (height ratio for acetate and glycolate) of HSS and molybdate were averaged. The exact concentrations of HSS in the samples were obtained by comparison of their ratios with the corresponding standard curves. The statistical error was in the range of 5%-10%.

Since acetate and glycolate extracted by Aliquat® 336 could not be completely separated by the first CE method, the second CE method was used to determine the acetate concentration. The near 100% overlapped peak from the first CE method was probably due to changes of aqueous phase matrix after contacting with Aliquat® 336. Such changes could have affected both HSS differently on how they would be separated by the first CE technique. The effect could have potentially shifted both peaks causing such overlap to occur. The sample was initially run with the second CE method and the acetate concentration was identified by calibrating its area with the additional standard curve of acetate also generated by the second CE procedure. This acetate concentration was subsequently used to determine the corresponding area ratio of the acetate peak from its standard curve made earlier by the first CE method. This area was a representative of the exact area of acetate peak if the sample was only analyzed for acetate by the first CE approach. Later on, the same sample analyzed by the first CE technique was used to determine the overlapped area of acetate and glycolate. The combined area was then subtracted by the predetermined acetate area to give the peak area of glycolate as it would have responded if only glycolate was present in the sample. Glycolate peak area was finally calibrated for the exact concentration with its calibration curve previously made by the first CE method.

1.7: Analysis of Neutral Degradation Products Using Gas Chromatography-Mass Spectrometry Technique (GC-MS)

For a typical GC-MS analysis, 1-μL sample was injected at the GC inlet set at 523 K using a split injection mode with a split ratio of 30 to 1. The GC oven was initially set at 373° K and ramped to 513° K at the rate of 280° K/min. The temperature was kept at 513° K for additional 10 minutes to ensure complete elution of all degradation products. A constant flow rate mode was used with helium carrier gas regulated at a flow rate of 1 mL/min. The GC-MS interface, MS quad, MS source, and EM voltage were kept at 523° K, 423° K, 503° K, and 1858° K, respectively. The MS scan mode used had a mass range from 10 to 300 daltons. Prior to analysis, standard curves of the degradation products were made. Standard mixture containing 100 to 1000 ppm of N-(2-hydroxyethyl)acetamide, 1-(2-hydroxyethyl)-2-imidazolidinone, imidazole, N-(2-hydroxyethyl)succinimide, and 2-oxazolidone were carefully prepared and analyzed 3 times using the GC-MS conditions described earlier. The external standard curves were generated by plotting averaged areas and the corresponding concentrations of the degradation products. Similar procedures were applied to the samples. The exact concentration of the degradation products were identified by calibrating the averaged peak areas with the corresponding standard curves. The accuracy of GC-MS technique reported in terms of standard error was less than 5%.

Example 2

Extractions Using TOA and Aliquat® 336

2.1: Extraction of HSS in Water

An aqueous HSS solution without MEA was initially used both to study the effect of concentrations of TOA and Aliquat® 336, and also to determine the optimum concentration of each extractant. The results were used to establish the effect of MEA. TOA and Aliquat® 336 were investigated using concentrations in the range of 0.2 to 1 kmol/m$^3$ in 1-octanol diluent. Higher concentrations were not used since they were found unsuitable, especially for Aliquat® 336. Concentrations higher than 1 kmol/m$^3$ Aliquat® 336 generated emulsion during extraction. The formation of emulsion made separation between extractant and aqueous phase extremely difficult. The HSS solution used for extraction contained 1000 ppm of formate, acetate, propionate, butyrate, oxalate, succinate, and glycolate. Sulfate, sulfite, and thiosulfate of equivalent concentration were also added to represent $SO_2$-derived HSS. The extraction temperature, extractant to aqueous phase volume ratio, and mixing time were kept at room temperature, 1 to 1, and 10 minutes, respectively unless otherwise noted, FIG. 1 shows the concentration effect of TOA on extraction efficiency of HSS used in this study. The extraction efficiency for HSS was found to increase as the concentration of TOA increased from 0.2 to 0.6 kmol/m$^3$. The maximum efficiency was reached when extraction was carried out using 0.6 kmol/m$^3$ TOA. The efficiency obtained at this optimum concentration was in the range of 58 to 96% for different HSS. The extraction efficiency slightly decreased as higher concentrations (0.7 to 1.0 kmol/m$^3$) were used. At the lower concentration range of TOA (i.e. 0.2 to 0.6 kmol/m$^3$), an increase of concentration increased the extracting capacity. Thus, more HSS could be transferred from the aqueous phase to the extractant phase. When the concentration was higher than 0.6 kmol/m$^3$, TOA became more viscous. A higher viscosity limits mass transfer of HSS from the aqueous phase to the extractant phase thereby minimizing the positive effect of higher TOA concentration, and thus reducing the anticipated higher extraction efficiency.

Figure 2:
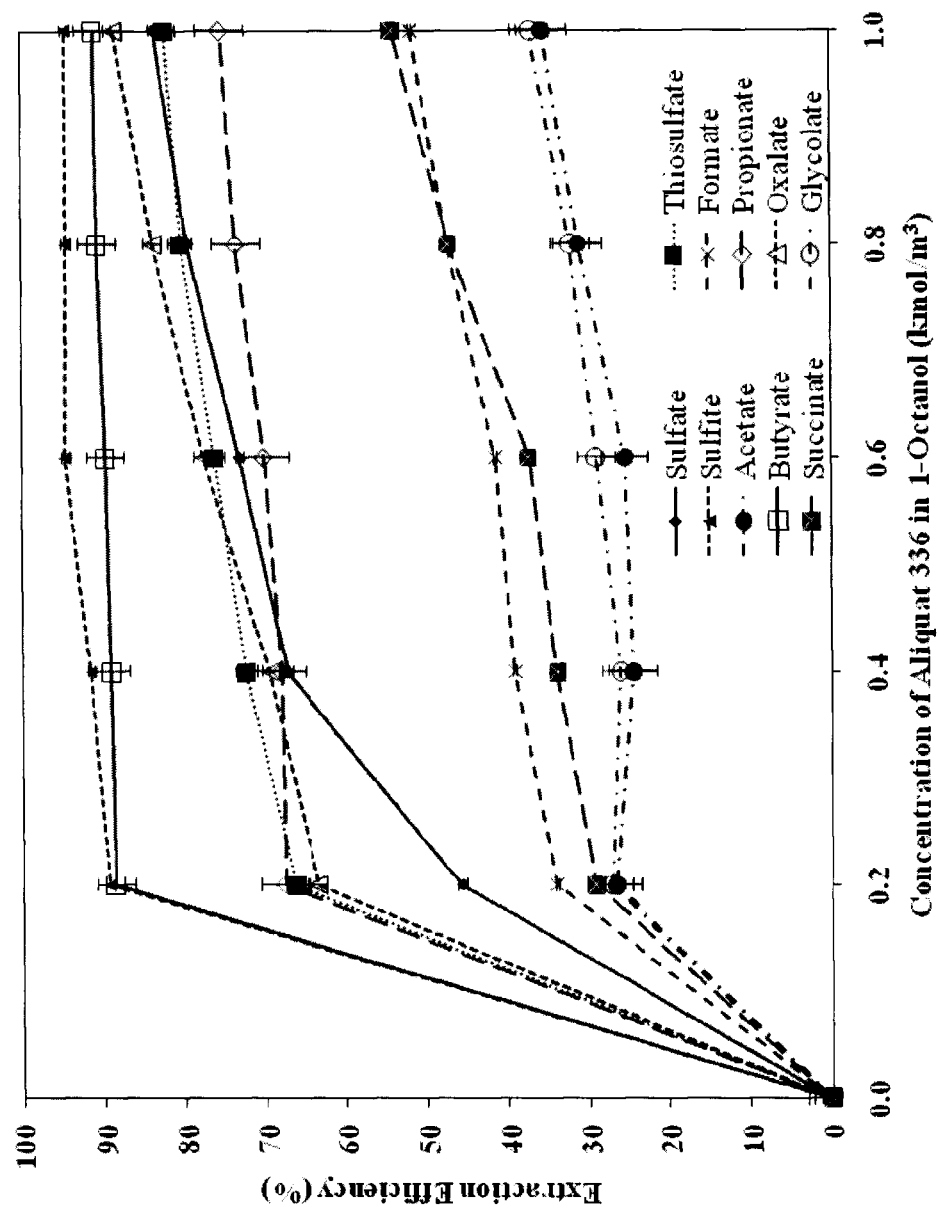
FIG. 2 is a chart showing the effects of Aliquat® 336 in 1-octanol on the efficiency of HSS extraction from water.

The effects of Aliquat® 336 concentration are shown in FIG. 2. The extraction efficiencies of all HSS concentrations were found to increase steadily from 0.2 kmol/m$^3$ until a maximum was reached at 1 kmol/m$^3$. The efficiency obtained at this concentration was in the range of 36 to 91% for various HSS.

2.2: Extraction of HSS in Aqueous MEA Solution

Figure 3:
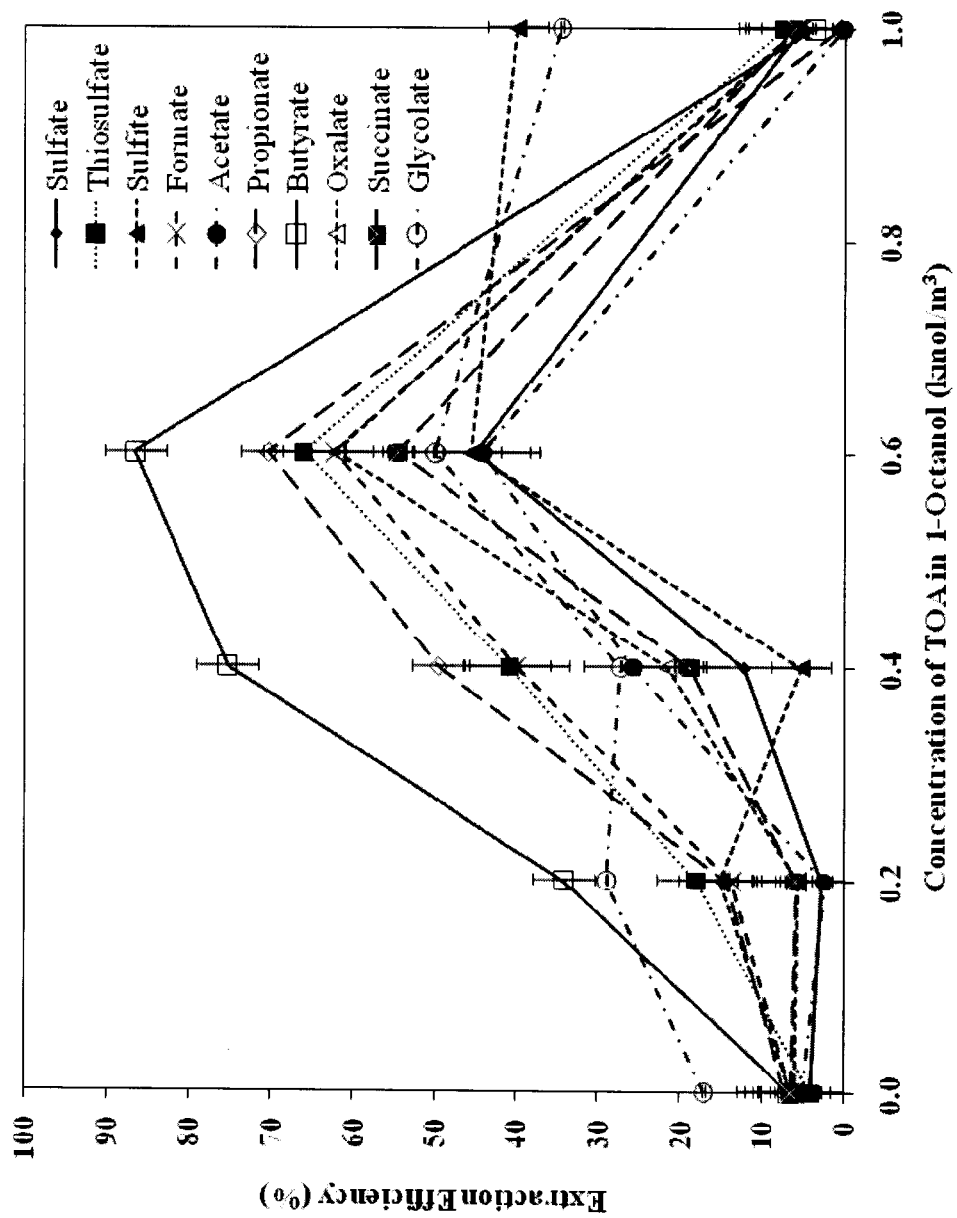
FIG. 3 is a chart showing the effects of TOA in 1-octanol on the efficiency of HSS extraction from 5 kmol/m$^3$ MEA.
Figure 4:
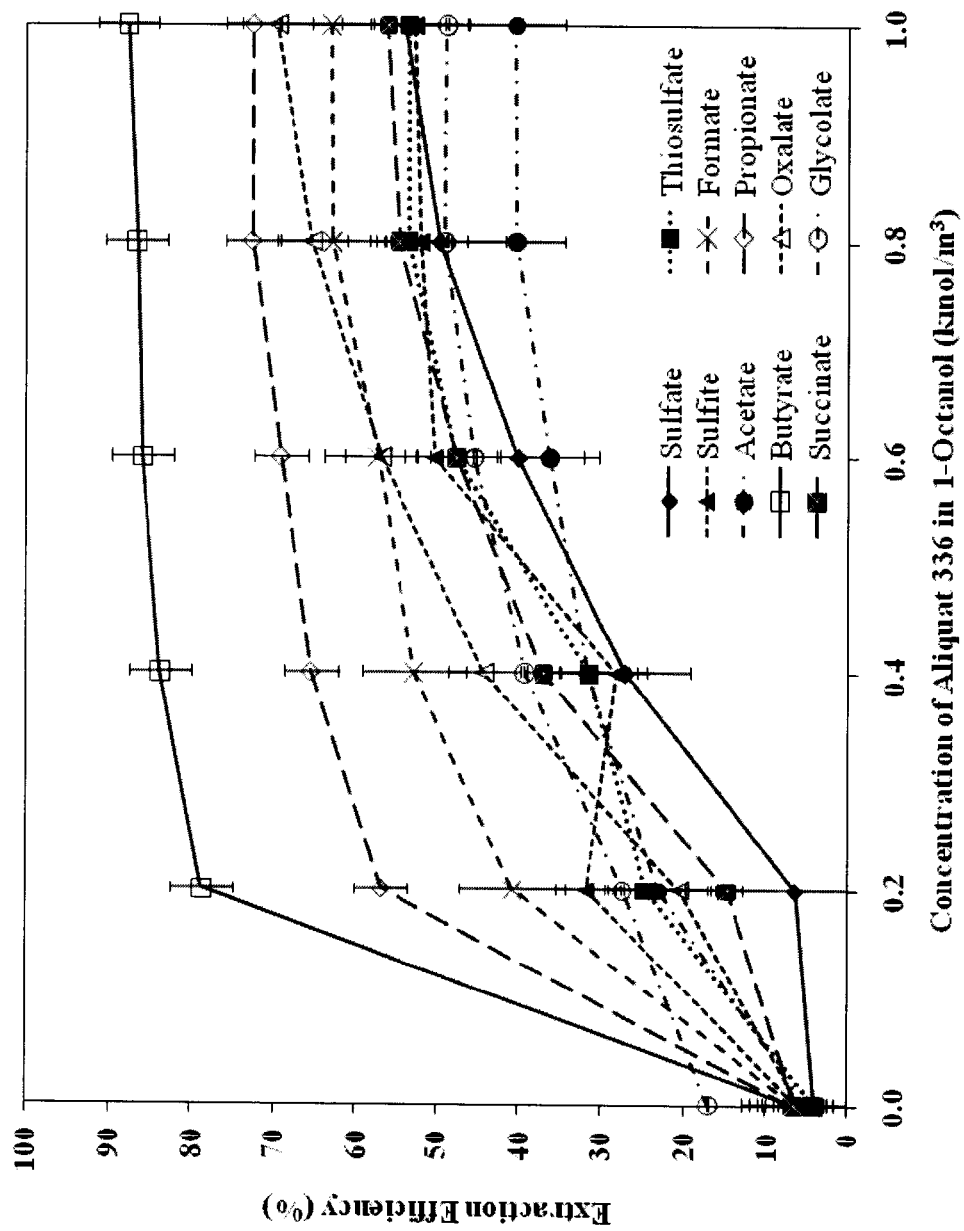
FIG. 4 is a chart showing the effects of Aliquat® 336 in 1-octanol on the efficiency of HSS extraction from 5 kmol/m$^3$ MEA.

The extraction technique was also carried out for the removal of HSS in 5 kmol/m$^3$ aqueous MEA solution. Similar concentrations of HSS as used in section 2.1 were also used in the MEA solution. The concentrations of TOA and Aliquat® 336 in 1-octanol were separately varied from 0 to 1 kmol/m$^3$. The extraction efficiencies obtained from various concentrations of TOA and Aliquat® 336 are shown in FIGS. 3 and 4, respectively. In FIG. 3, all HSS show similar trend in which the efficiency increased as the concentration of TOA increased from 0 kmol/m$^3$ until the maximum extraction was reached with 0.6 kmol/m$^3$. At the optimum concentration, the maximum extraction range of 44 to 86% was obtained for various HSS. Unlike non-MEA systems, the extraction efficiency dropped dramatically when extractions were performed using higher concentrations of TOA (e.g. 1 kmol/m$^3$). Similar explanation given for the non-MEA system in which high viscosity limited the mass transfer could be used to explain the current decrease in extraction efficiency with increase of concentration of TOA beyond 0.6 kmol/m$^3$. In addition to viscosity, the presence of MEA also has an effect.

The effects of Aliquat® 336 concentrations are shown in FIG. 4. The extraction efficiency of all HSS increased dramatically when 0 to 0.4 kmol/m$^3$ Aliquat® 336 was used. However, the effects became less significant when the extraction was performed with 0.5 to 1 kmol/m$^3$ Aliquat® 336. At the optimum concentration of 1 kmol/m$^3$ Aliquat® 336, the extraction efficiency obtained was in the range of 40 to 88%.

2.3: Effects of MEA

Figure 5:
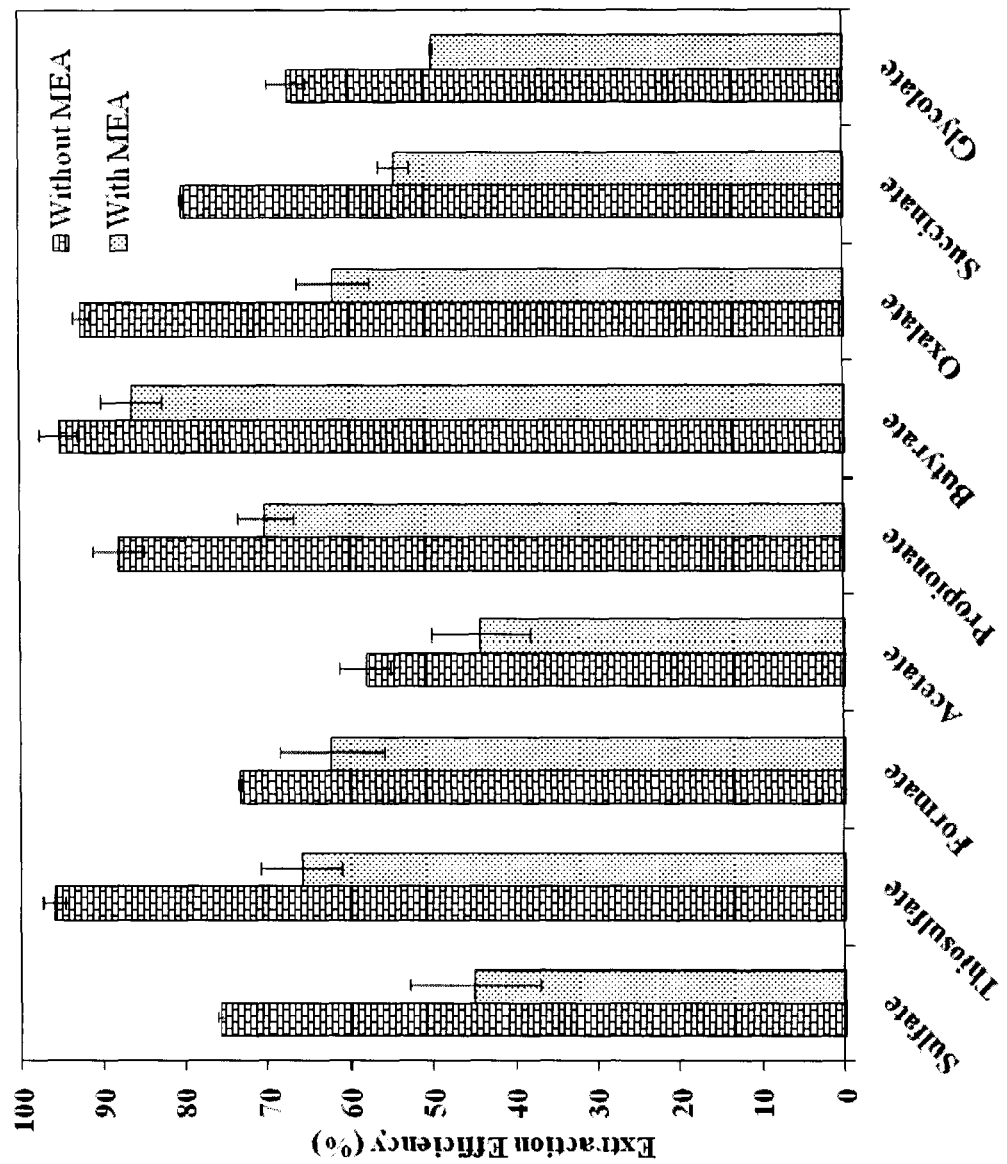
FIG. 5 is a chart showing the effects of MEA on the efficiency of HSS extraction using 0.6 kmol/m$^3$ of TOA in 1-octanol.

MEA played a significant role in the extraction of HSS using TOA and Aliquat® 336. Even with the same extractant, the extraction efficiency of HSS was different in the presence and absence of MEA. In order to study the effect of MEA, the extraction data of HSS obtained in section 2.1 and 2.2 at optimum concentrations of TOA (i.e. 0.6 kmol/m³) and Aliquat® 336 (i.e. 1 kmol/m³) were used for comparison. FIG. 5 shows the extractability of HSS in water and aqueous MEA solution using TOA. It is clear that the efficiency of all HSS decreased when MEA was present in the system. The extraction efficiency was reduced to as much as 31% for sulfate, thiosulfate and oxalate while butyrate was affected the least with a 9% decrease. The remaining HSS showed the decrease between 11 to 25%. To understand the decrease of TOA extraction performance when MEA was present, an extraction mechanism of HSS by TOA needs to be established.

TOA is an aliphatic amine which extracts acids from an aqueous phase by forming an acid-base complex with the un-dissociated acids. The extraction mechanism corresponding to the acid-base complex formation by hydrogen bonding for HSS extraction can be given as in Eq (3).

$$\overline{TOA} + HA \leftrightarrow \overline{TOA\text{-}HA} \qquad (3)$$

The extraction by ion-pair formation of TOA and acid was suggested Kyuchoukov, et al. (2001, "*Extraction of Lactic Acid by Means of a Mixed Extractant*". Ind. Eng. Chem. Res., 40 (23), 5635-5639). The reaction corresponding to HSS extraction in the current study is given in Eq (4).

$$\overline{TOA} + H^+ + A^- \leftrightarrow \overline{TOA\text{-}H^+A^-} \qquad (4)$$

where species with over bar, HA and A⁻ represent species in organic extractant phase, un-dissociated HSS, and dissociated HSS, respectively.

Dissociation of HSS and pH of the aqueous phase play a significant role in determining the extraction mechanism and, more importantly, the extraction efficiency. HSS can exist in un-dissociated or dissociated forms (i.e. HA or A⁻) following the reaction given in Eq (5);

$$HA \leftrightarrow H^+ + A^- \qquad (5)$$

Equation (6) can be used to relate the pH of the aqueous phase to the concentration ratio of A⁻ and HA:

$$pH = pK_a + \log\frac{[A^-]}{[HA]} \qquad (6)$$

where $K_a$, [A⁻], and [HA] are acid dissociation constant of HSS, and concentrations of dissociated HSS and un-dissociated HSS, respectively.

For the extraction without MEA, the pH of the aqueous phase was measured at 2.7. Based on Eq (6) alone, the organic HSS used in this study except oxalate, existed at 10 to 100 times more in the un-dissociated form than the dissociated form while the opposite was observed for the stronger acidic oxalate and inorganic HSS (i.e. sulfate and thiosulfate). This could suggest a difference in the dominant extraction mechanism.

When HSS was added in 5 koml/m³ MEA solution, the aqueous phase pH changed to 11.5. At this pH, the organic HSS was present mostly in the dissociated form. Hong et al. (2005, "*Removal of Acetic Acid from Aqueous Solutions Containing Succinic Acid and Acetic Acid by Tri-n-octylamine*". Separation and Purification Technology., 42, 151-157) reported that TOA will preferentially extract un-dissociated acids. This could account for the reduction of the extraction efficiency of the organic HSS as shown in FIG. 5. Oxalate and inorganic HSS were also affected at this pH. The dramatic increase of [A⁻] as compared to [HA] could also be blamed for the decrease in the extraction efficiency. The negative effect of MEA could be two-fold. In addition to the decrease of extraction efficiency induced by pH change, the strong bonding of MEA and HSS could also contribute to the reduced TOA extraction performance. This effect is more prominent for stronger acidic species (i.e. oxalate and inorganic sulfate and thiosulfate) since they chemically bond more strongly to MEA. The organic HSS (i.e. formate, acetate, propionate, butyrate, glycolate, and succinate) experienced less bonding force due to much less acidity. This could explain the larger reduction in extraction efficiency observed (over 30% for oxalate, sulfate, and thiosulfate) when MEA was present whereas, most of the organic HSS experienced less than 20% decrease in efficiency.

Figure 6:
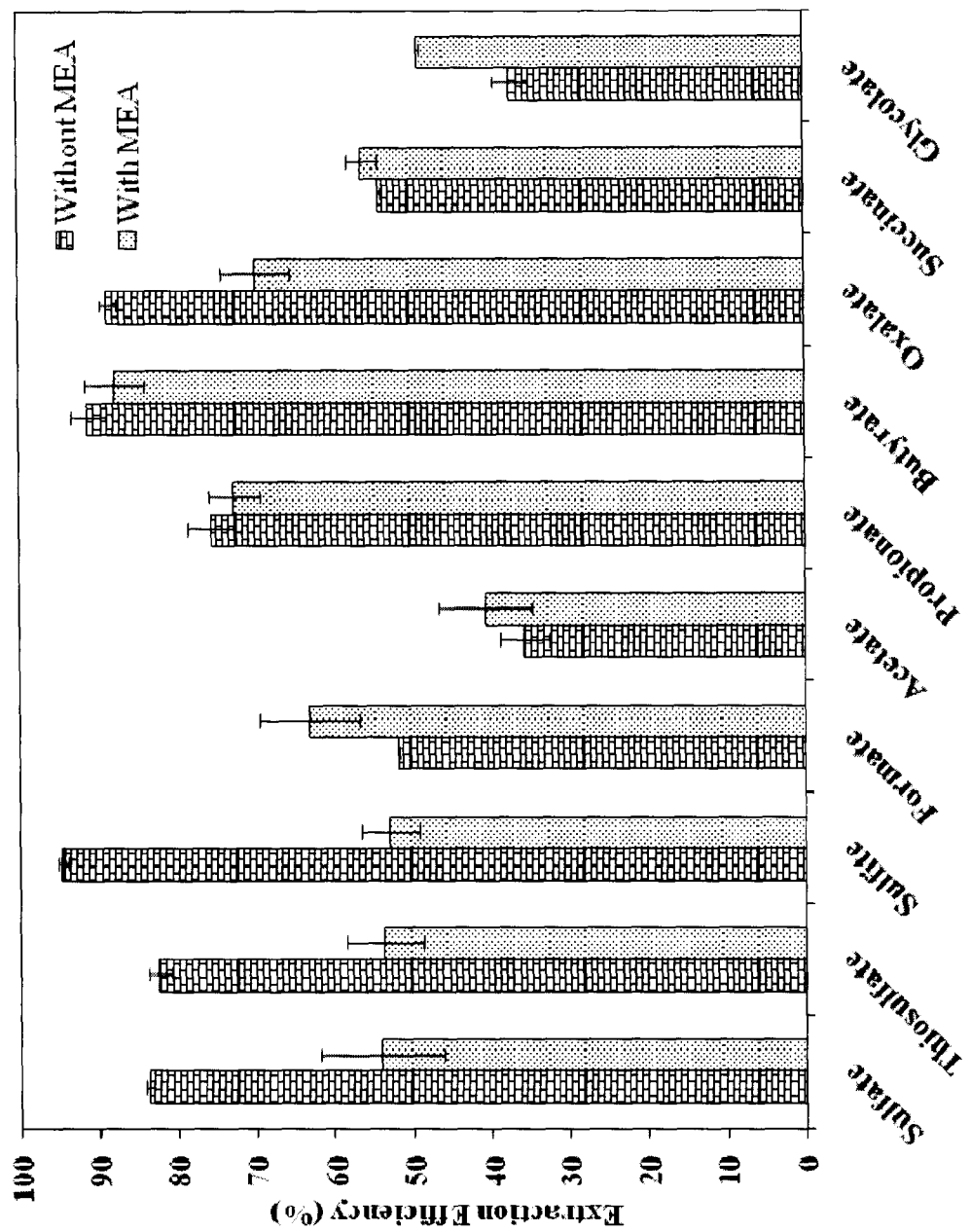
FIG. 6 is a chart showing the effects of MEA on the efficiency of HSS extraction using 1.0 kmol/m$^3$ of Aliquat® 336 in 1-octanol.

FIG. 6 represents the MEA effect on the extractability of HSS at room temperature by 1 kmol/m³ Aliquat® 336 in 1-octanol. As a quaternary ammonium salt, Aliquat® 336 can extract HSS based on the ion exchange reaction as follows;

$$\overline{R_4N^+Cl^-} + A^- \leftrightarrow \overline{R_4N^+A^-} + Cl^- \qquad (7)$$

where $R_4N^+Cl^-$ represents Aliquat® 336.

In non-MEA system, oxalate, sulfate, and thiosulfate still yielded high percentage of extraction efficiency respectively measured at 89%, 84%, and 82%, which were higher than those of the remaining HSS except butyrate. Based on previous discussion, inorganic HSS and oxalate, even though at low pH, existed mostly in the dissociated form, thus favouring the ion-exchange reaction of Aliquat® 336 as given in Eq (7). While the rest shows efficiency only between 36% to 75% except butyrate of which 91% was extracted. The low extractability of formate, acetate, propionate, succinate, and glycolate were observed because their existence in the un-dissociated form was unfavorable to Aliquat® extraction. Butyrate was the exception possibly due to its long-chained molecule and higher hydrophobicity, which allowed a better solvation by Aliquat® 336 and 1-octanol, thereby giving a better extraction.

It is clear from FIG. 6 that MEA also affected the performance of Aliquat® 336. A strong interaction of MEA and oxalate, thiosulfate, and sulfate could have played a major role in the decrease of extraction efficiency respectively for 19%, 28%, and 30%. On the other hand, the extractability of organic HSS especially formate and glycolate was boosted up with MEA up to as high as a 12% increase in extraction efficiency. The increase of pH to 11.5 in MEA solution could be responsible because it totally shifted Eq (5) to the right resulting in the organic HSS existing mostly in the dissociated form which is preferred for Aliquat® 336 extraction. Although MEA interacted with these organic HSS, its effect was less pronounced than that of the previous HSS group (i.e. oxalate, thiosulfate, and sulfate) due to a much weaker interaction with MEA. The effect of pH, therefore, could have overcome the effect of MEA interaction and thus became dominant. MEA did not have a significant effect on propionate and butyrate though it helped to increase the solution pH, and thus to promote the formation of dissociated form of the two. In our view, the extraction capacity limit of both HSS must have been reached and no further increase in extraction efficiency could be obtained.

Example 3

Selection of Extractant for $CO_2$ Absorption Process

Figure 7:
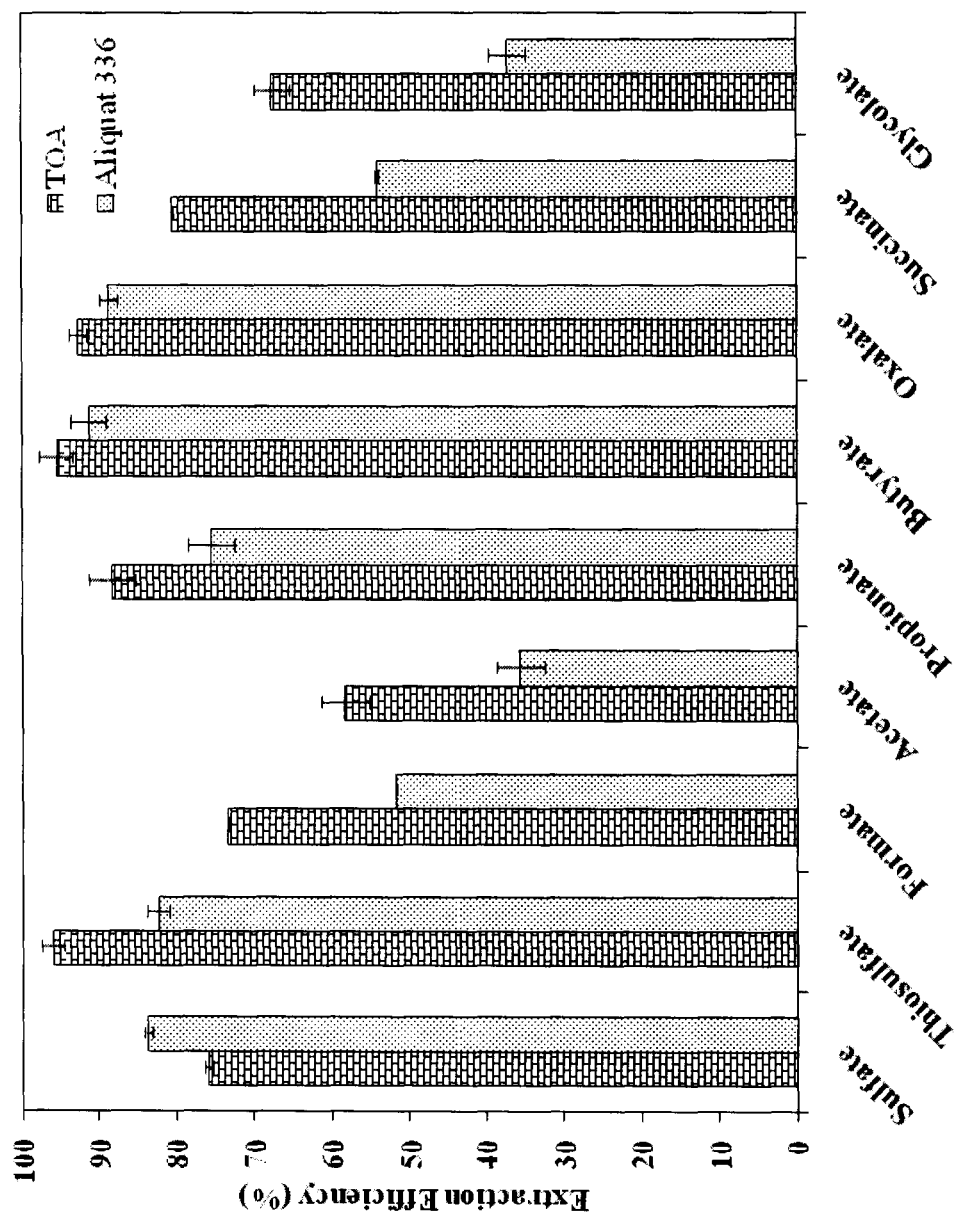
FIG. 7 is a chart comparing the extraction efficiency of 0.6 kmol/m$^3$ TOA and 1 kmol/m$^3$ Aliquat® 336 for recovery of HSS from water.
Figure 8:
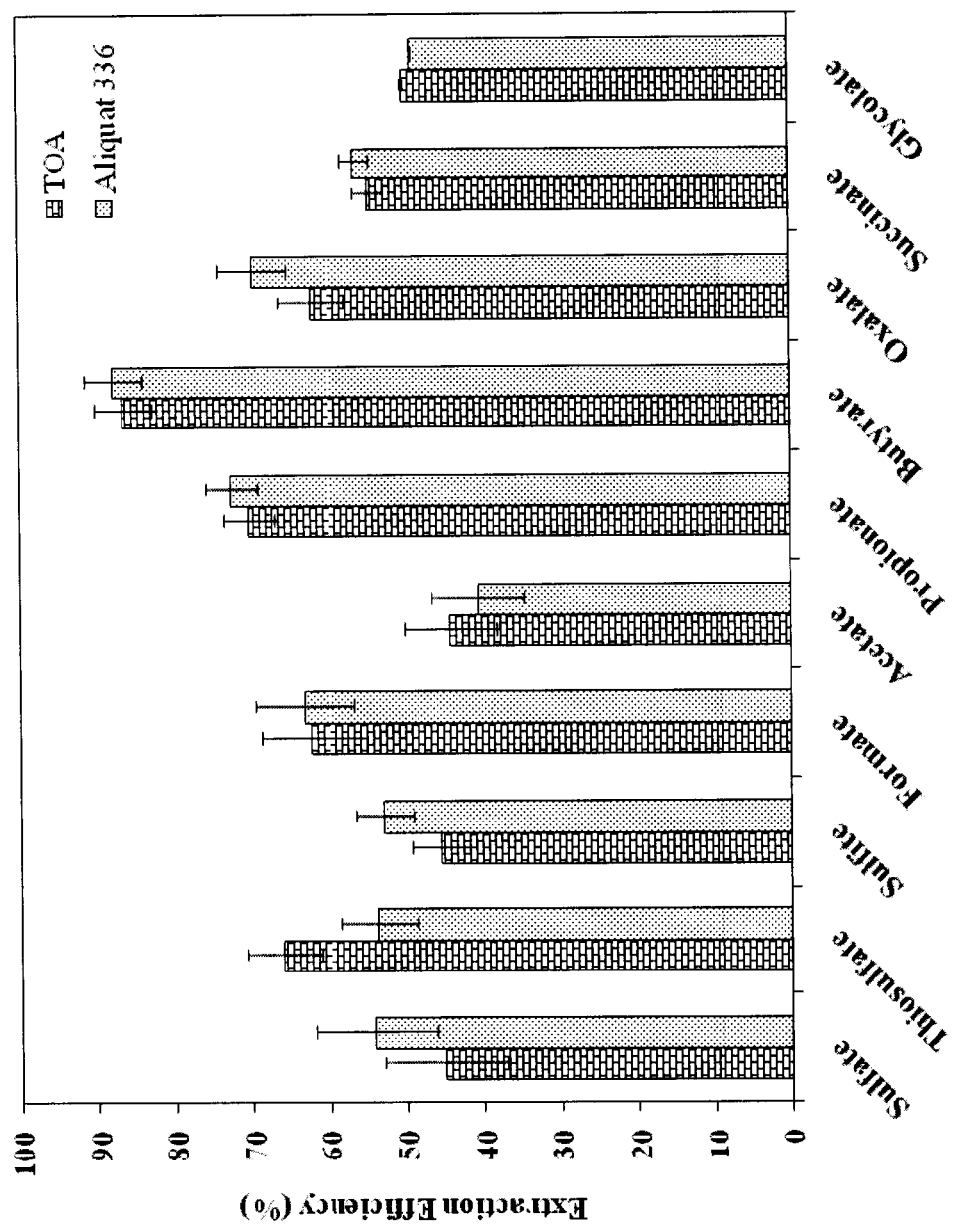
FIG. 8 is a chart comparing the extraction efficiency of 0.6 kmol/m$^3$ TOA and 1 kmol/m$^3$ Aliquat® 336 for recovery of HSS from 5 kmol/m$^3$ MEA.

TOA worked much more effectively than Aliquat® 336 at a low pH (essentially the system without MEA) as shown in FIG. 7. In order to select the extractant for removal of HSS in CO₂ absorption process, their extraction efficiencies for HSS in aqueous MEA solution must be compared. FIG. 8 shows a side by side comparison of HSS extraction efficiency in MEA solution using TOA and Aliquat® 336. When MEA was present, a superior extraction efficiency of Aliquat® 336 to TOA was observed for sulfate and oxalate. Formate, acetate, propionate, butyrate, glycolate, and succinate showed somewhat similar affinity to both extractants. Thiosulfate was the only HSS extracted for which TOA was 12% better than Aliquat® 336 in the MEA system.

Although the extraction efficiencies of TOA and Aliquat® 336 were generally close in aqueous MEA solution, Aliquat® 336 was selected for further investigation for two reasons. First, the extraction efficiency of Aliquat® 336 could be improved if the Aliquat® 336 was chemically modified. In contrast to TOA, Aliquat® 336 is a quaternary ammonium based anion exchange compound in which its chloride (Cl⁻) exchanges with HSS in aqueous amine phase during extraction. In order to increase its extraction efficiency, the Cl⁻ can be replaced with a less-attracting exchange ion. Based on the degree of affinity, hydroxide (OH⁻) is found suitable having less affinity to the anion exchanger than Cl⁻. The ease of ion exchange ability of OH⁻ could therefore, increase the HSS extractability from aqueous amine phase. During the extraction, the use of Aliquat® 336 was also found to introduce Cl⁻ into the amine solvent via anion-exchange reaction. The introduction of Cl⁻ is undesirable because it can induce corrosion problem to the CO₂ absorption plant. Thus, chemical modification of Aliquat® 336 described earlier also serves to prevent chloride contamination in the amine solution. Further extraction with TOA was also carried out. However, it was only done by the use of TOA and modified Aliquat® in 2-step or mixed extraction to determine for a possible synergistic effect and reduction of Cl⁻ contamination.

Example 4

Improvement of HSS Extraction Efficiency 4.1: OH-Converted Aliquat®

Figure 9:
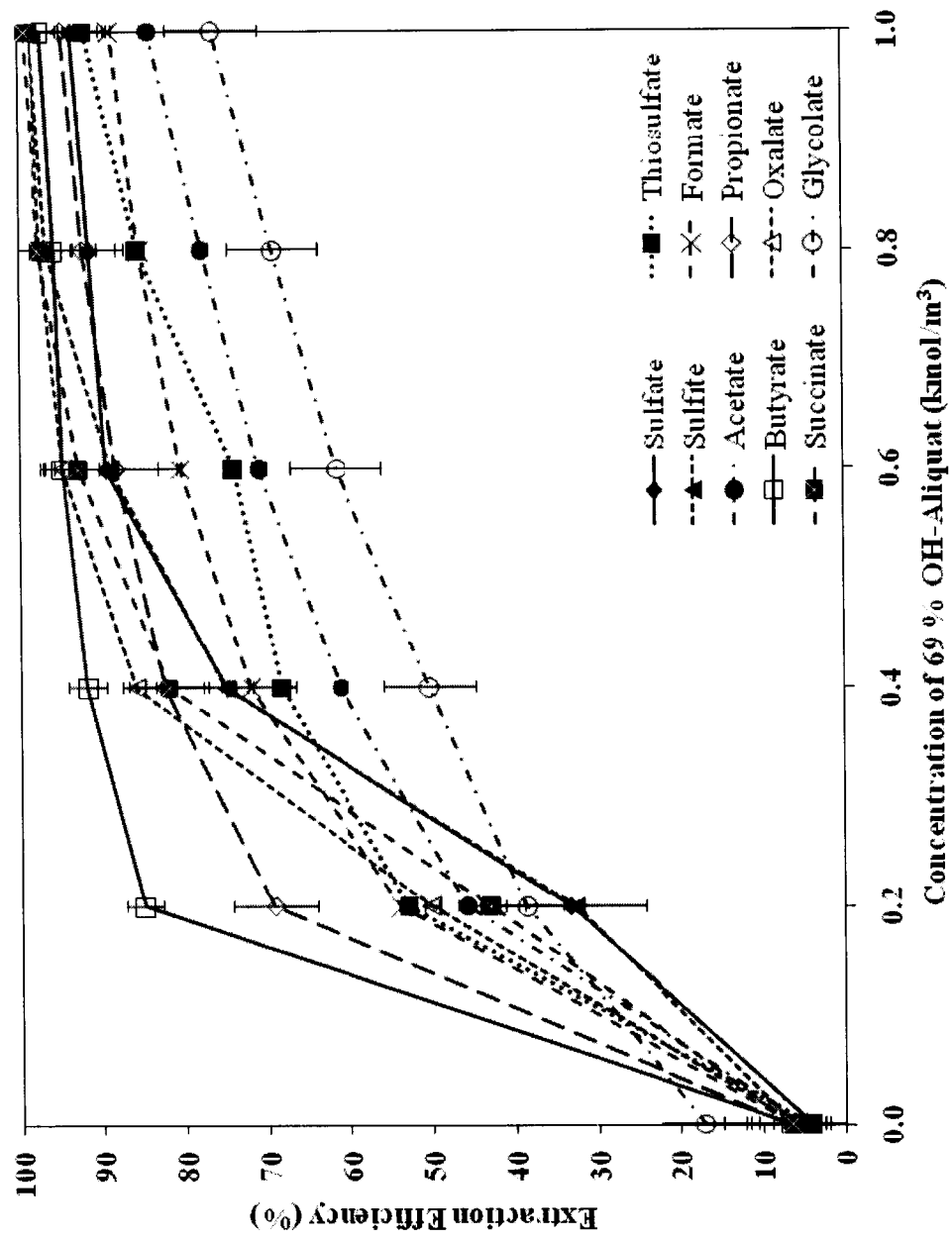
FIG. 9 is a chart showing the effects of 69% OH-Aliquat® combinations on the efficiency of HSS extraction from 5 kmol/m$^3$ MEA.
Figure 10:
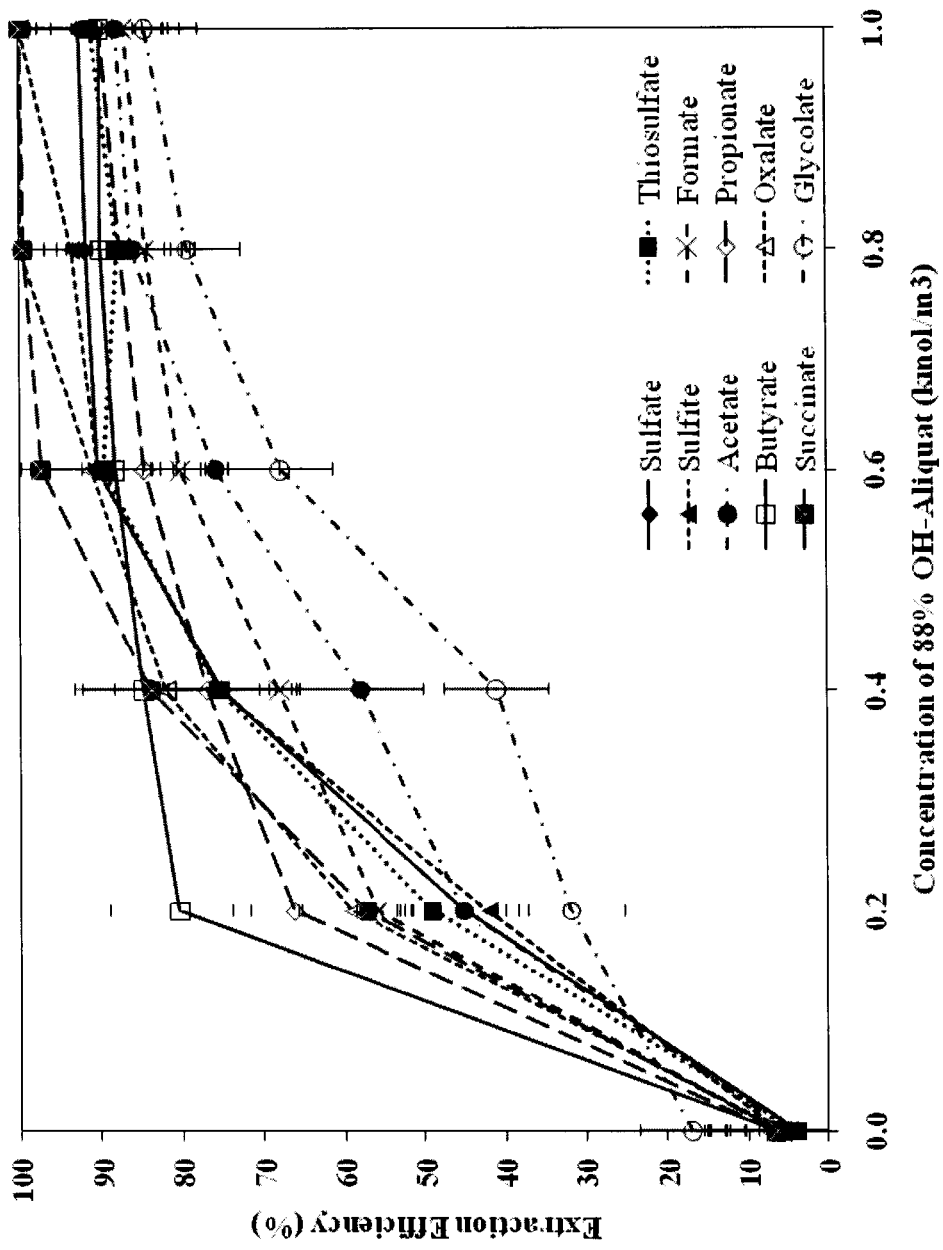
FIG. 10 is a chart showing the effects of 88% OH-Aliquat® combinations on the efficiency of HSS extraction from 5 kmol/m$^3$ MEA.

Attempts were made to increase the extraction efficiency of HSS in MEA solution using chemical modification done by replacing Cl⁻ with OH⁻ in the structure of Aliquat® 336. The degrees of conversion obtained were 69%, 79%, 87%, and 88%. To ensure the working concentration for the converted Aliquat® still remained 1 kmol/m³, 69% OH⁻ contained Aliquat® was initially used to determine the optimum concentration. FIG. 9 shows the extraction efficiency of HSS with various concentrations of 69% converted Aliquat® in 1-octanol. Similar trend as obtained for the original Aliquat® was observed. The efficiency dramatically increased from 0 to 0.3 kmol/m³. Higher than 0.4 kmol/m³, the increase of the efficiency began to slow down and finally reached the maximum extractability at 1 kmol/m³. About 88% converted Aliquat® also gave the same trend in which 1 kmol/m³ was found to be the optimum as shown in FIG. 10. Therefore, this concentration is used for the remaining converted Aliquat® to determine the extraction efficiency.

Figure 11:
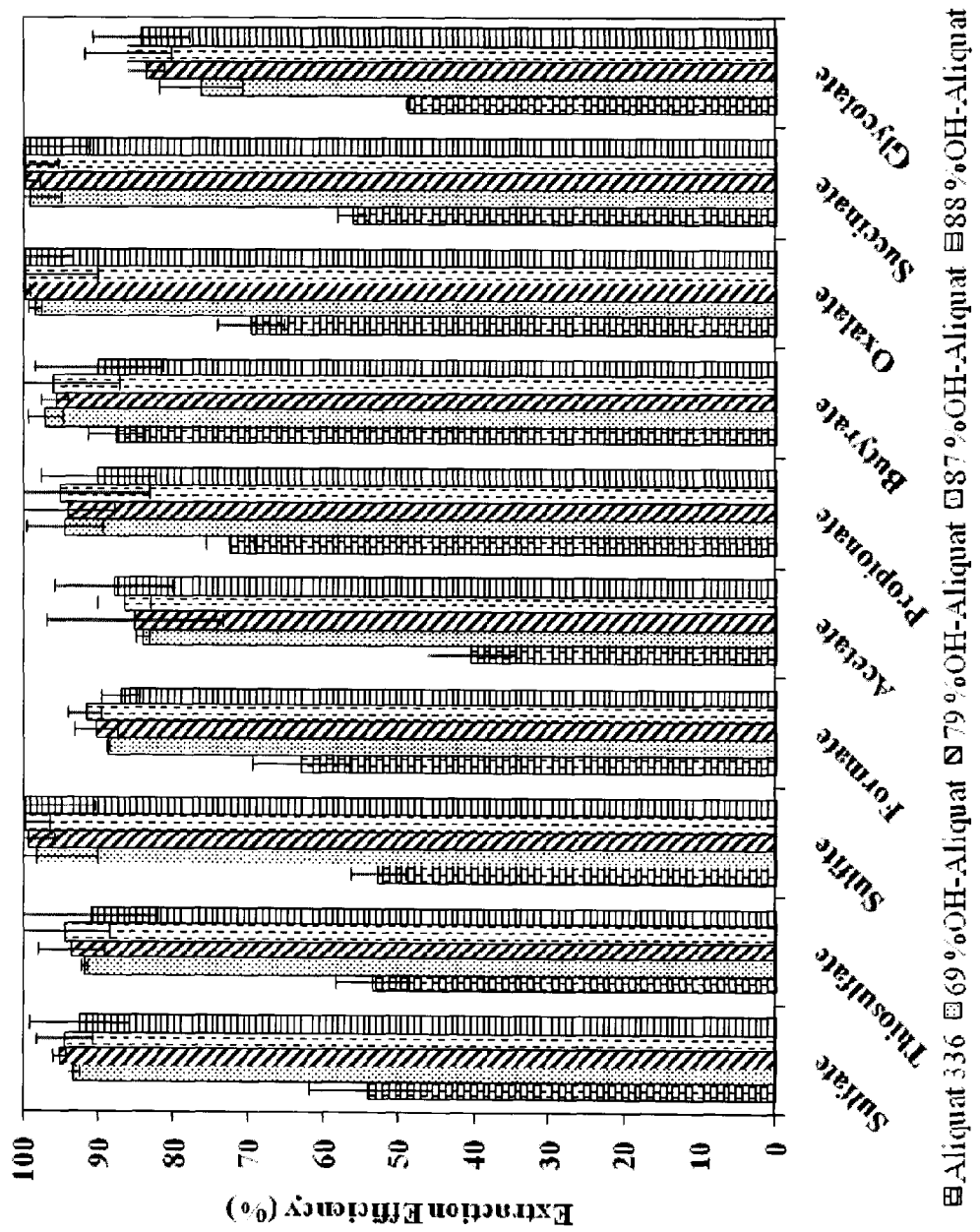
FIG. 11 is a chart showing the effects of OH-modified Aliquat® combinations on the efficiency of HSS extraction from 5 kmol/m$^3$ MEA.

FIG. 11 represents the effect of % OH⁻ on the extractability of HSS in MEA solution at room temperature. The efficiency of the original Aliquat® 336 is also included for comparison. At the optimum concentration of 1 kmol/m³, 69% conversion of Aliquat® clearly improved the extractability of the original Aliquat®. The extraction efficiency was increased by 45%, 44%, 42%, 39%, 38%, 36%, 29%, 22%, 20%, and 9%, respectively for sulfite, acetate, succinate, sulfate, thiosulfate, formate, oxalate, propionate, glycolate, and butyrate. The majority of HSS reached 90% extraction efficiency with 69% OH⁻ aliquot. It shows that using OH⁻ Aliquat® is more effective in the ion exchange process with HSS than the original with Cl⁻. It is also clear that the difficult to remove ions (such as inorganic sulfate and thiosulfate) benefited the most, though they bind strongly with MEA in the aqueous solution as mentioned previously in FIG. 6. Highly hydrophilic HSS such as formate and acetate were also extracted into the organic phase much better with the OH⁻ modified Aliquat®.

OH⁻ Aliquat® of 79%, 87%, and 88% were additionally tested using 1 kmol/m³ in 1-octanol. Also shown in FIG. 11, an increase of % OH⁻ in the Aliquat® structure from 69% to 79%, 87% and 88% did not yield any significant increase in the extractability of HSS in which the extraction efficiency of most HSS still remained above 90%. The exception was only for glycolate in which a clear improvement was observed increasing from 69% to above 80%. The apparent insignificant effect of % OH⁻ increase could be as a result of the anion-exchange equilibrium between OH⁻ and HSS reaching its maximum capacity at about 60% to 70% conversion. Further increase of extraction with higher % OH⁻ was therefore not possible under the prevalent extraction condition.

4.2: Two-Stage Extraction and Mixed OH Aliquat® and TOA

Figure 12:
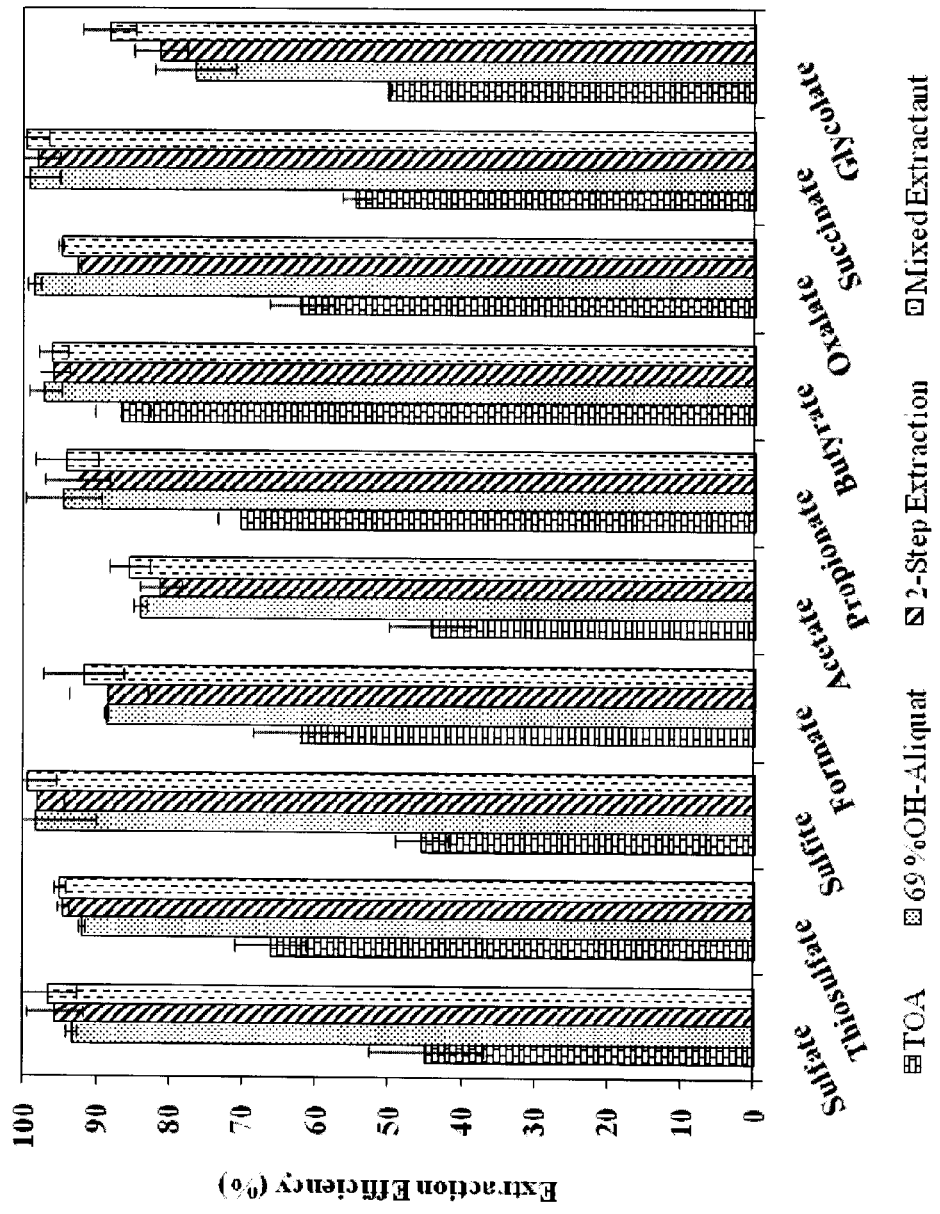
FIG. 12 is a chart comparing the effects of TOA, a 69% OH-Aliquat® combination, a 2-step extraction, and an extractant mixture on the efficiency of HSS extraction from 5 kmol/m$^3$ MEA.

Two-stage extraction was carried out by applying 69% OH Aliquat® of 1 kmol/m³ to extract HSS from aqueous MEA solution. 0.6 kmol/m³ TOA was respectively used in the second step to extract additional HSS from the aqueous solution. The efficiency of the 2-step extraction is shown in FIG. 12. The data for TOA and 69% converted Aliquat® alone are also separately given in the same figure for comparison. The 2-step extraction clearly extracted HSS much better than TOA alone giving the removal efficiency in the range of 81% to 98%. However, it showed similar extractability to 69% OH⁻ Aliquat® for all HSS except glycolate in which its efficiency was increased from 69% to 81%. A mixture of the 2 extractants using their optimum concentrations also performed well and equal to 69% converted Aliquat®. Above 90% extraction efficiency was obtained for most HSS with glycolate and acetate being only above 80% efficiency range. A mixture of 69% OH⁻ Aliquat® and TOA clearly showed synergistic effect. It boosted TOA extractability dramatically. In summary, the extraction using 2 step and mixed extractants was superior to the extraction using TOA alone. On the other hand, the mixture performance was equal to 69% OH⁻ converted Aliquat®. This indicates that converted Aliquat® alone is capable of cleaning up HSS in MEA solution.

4.3: Management of Contamination in Amine Solution

As mentioned previously, the chemical modification of Aliquat® 336 was also served to reduce Cl⁻ contamination in MEA solution during extraction. Table 3 shows the concentration of Cl⁻ released into MEA solution after the extraction using OH⁻ converted Aliquat® of various conversions.

TABLE 3

| Concentration in MEA solution after extraction with various OH modified Aliquat ® | |
|---|---|
| OH Modified Aliquat ® (%) | Chloride Concentration After Extraction (ppm, ±10) |
| 69 | 218 |
| 79 | 188 |
| 87 | 130 |
| 88 | 120 |

Less concentration of Cl⁻ was found if a higher % conversion to OH⁻ of Aliquat® was used. The Cl⁻ contamination was a result of competitive ion exchange reaction of the remaining Cl⁻ and OH⁻ in the converted Aliquat® structure for HSS in the amine solution. This shows that modification of Aliquat® is absolutely necessary not only for increasing its extraction power but also for reducing Cl⁻ contamination in MEA solution.

The mixed extractant and two-stage extraction techniques were also tested for Cl⁻ removal. To clearly see the Cl⁻ removal efficiency, competitive reaction of HSS-Aliquat® was eliminated. Therefore, tests were carried out with only Cl⁻ in MEA solution. 5 kmol/m³ MEA solution initially containing 60 ppm Cl⁻ was used for extraction. 87% converted Aliquat® and TOA at 1 and 0.6 kmol/m³, respectively was used in both extraction techniques. Table 4 shows concentration of Cl⁻ in MEA solution before and after mixed extractant and 2-step extractions. The results showed that the use of the mixed extractants reduced Cl⁻ concentration from 60 to 36 ppm, which accounted for 40% removal. The two-stage extraction was found to be superior to the mixed extractants because it reduced the concentration of Cl⁻ to 16 ppm equivalent to 73% removal efficiency. This shows that contamination is manageable with both the 2-step extraction and mixed extractants, but more so by the 2-step extraction.

TABLE 4

Removal of Cl⁻ from 5 kmol/m³ MEA solution using 2 step extraction and mixed extractant of 0.6 kmol/m³ of TOA and 1 kmol/m³ of 87% OH Aliquat ® at room temperature, 10 min mixing time and 1 to 1 phase ratio Chloride Concentration (ppm)

| | After Extraction | |
|---|---|---|
| Before Extraction | Mixed Extractant | 2 Step Extraction |
| 61 | 36 | 16 |

Example 5

Figure 13:
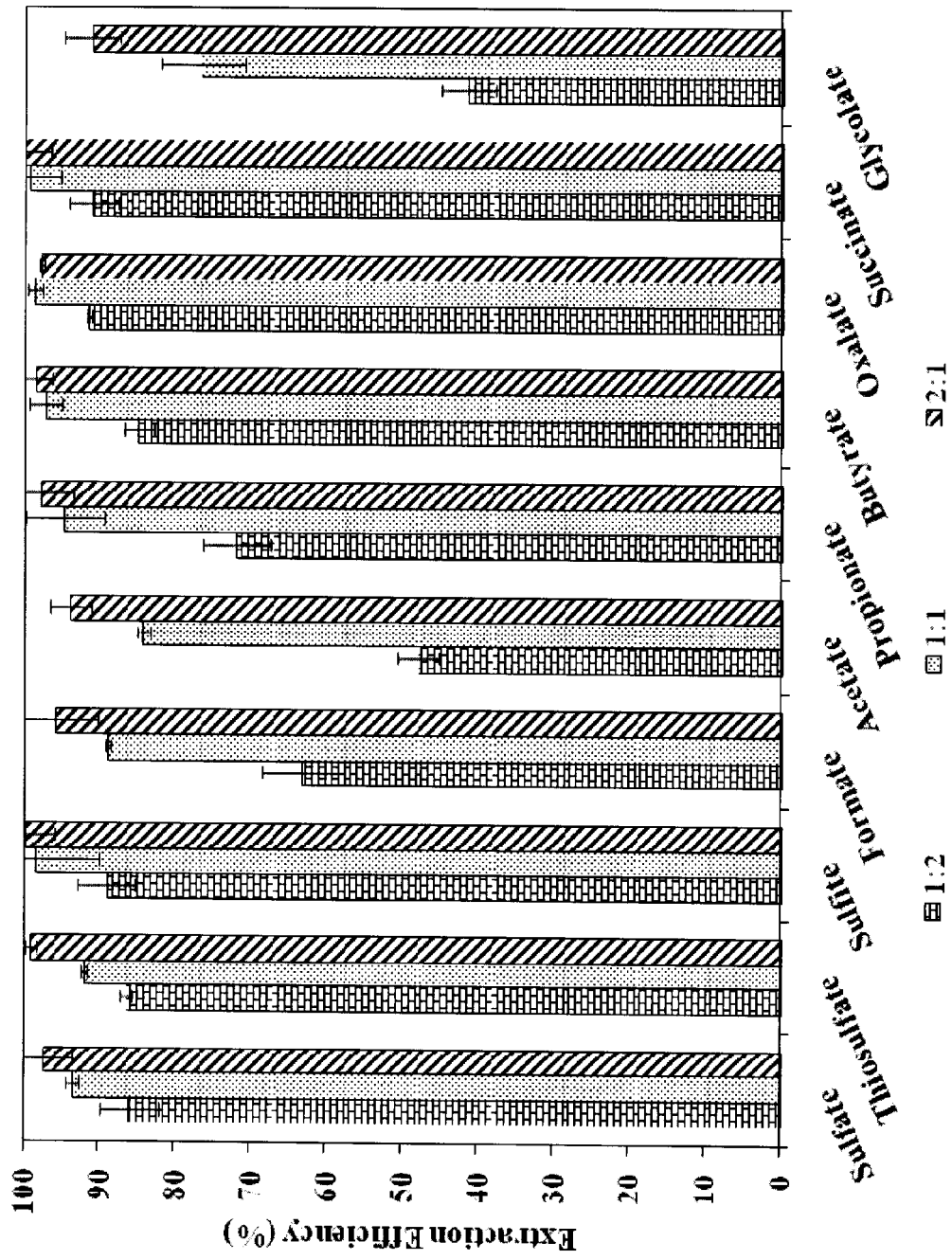
FIG. 13 is a chart showing the effects of phase ratios on the efficiency of HSS extraction from 5 kmol/m$^3$ MEA using a 69% OH-Aliquat® combination.

Optimization of Extraction Parameters 5.1: Effect of Phase Ratio of Aliquat® and Aqueous MEA Solution 69% conversion of Aliquat® at 1 kmol/m³ was used to determine the most effective Aliquat®/aqueous amine phase ratio. FIG. 13 shows the effect of phase ratio defined as volume ratio of Aliquat® in 1-octanol to aqueous MEA solution. Two phase ratios of 1 to 2 and 2 to 1 were tested and compared with previous data for 1 to 1. The phase ratio of 1 to 2 was found to result in a decrease in the extraction efficiency of HSS when compared with the base run using 1 to 1 phase ratio. It was also the least effective among the ratios tested yielding the least efficiency for all HSS. Most HSS showed extraction efficiencies well below 90% (example, 41% for acetate and 48% for glycolate were extracted from aqueous MEA solution). Oxalate and succinate were the only HSS for which more than 90% was extracted into Aliquat®. On the other hand, the extraction efficiency of all the HSS improved after switching from phase ratio 1 to 2 to 2 to 1. Doubling the volume of Aliquat® was able to extract most of the HSS higher than 94% from the amine phase and more than the phase ratio of 1 to 2. However, 2 to 1 phase ratio only showed either a little increase or unimportant change in the extraction efficiency over 1 to 1 ratio with the exception of glycolate. A marked improvement was seen from glycolate in which its extraction efficiency increased from 69% to 91% when the phase ratio changed from 1 to 1 to 2 to 1. The extraction ability increased with increase of the phase ratio was observed because a higher phase ratio (i.e. 2 to 1) contained more Aliquat®, thus increased the extraction capacity of the system. In our view, although the phase ratio of 2 to 1 was able to reach maximum extractability, 1 to 1 ratio performed fairly equivalent. This has made the extraction with the phase ratio 1 to 1 a preferred choice because it could save extractant cost. In addition, the use of less extractant also minimizes the generation and disposal of waste from the extraction process.

5.2: Extraction Temperatures

Figure 14:
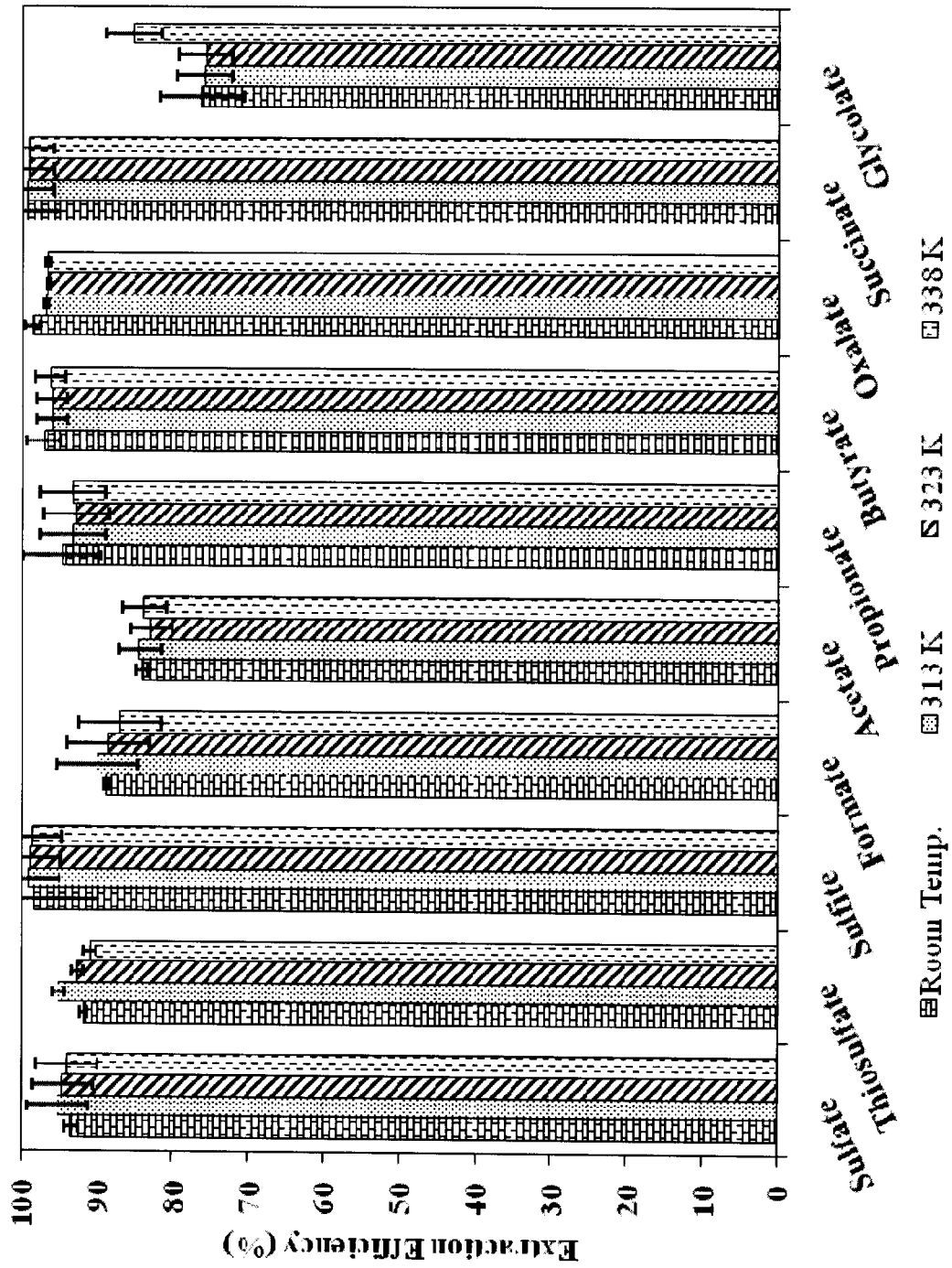
FIG. 14 is a chart showing the effects of temperature on the efficiency of HSS extraction from 5 kmol/m$^3$ MEA using a 69% OH-Aliquat® combination.

Extraction at temperatures of 313° K, 323° K, and 338° K were carried out and compared with previous run of room temperature. 69% OH Aliquat® with 1 to 1 phase ratio was still used throughout this section. The effect of temperature on extraction of HSS from MEA solution is illustrated in FIG. 14. Extraction efficiency of HSS remained unchanged throughout the tested temperature range. The exception only applied to glycolate, which was extracted better at a higher temperature. However, temperature did not significantly affect the overall extractability of the Aliquat®. Although a reaction of acid-amine complex in organic extractant phase is exothermic, the stability of the complex was less affected by temperature due to the stronger basicity of the amine. Since temperature in the study range has no effect, more choices are available as one can select to apply the extraction technique to the lean MEA stream after the rich/lean heat exchange either with or without cooling.

Example 6

Effect of CO₂ Loading

Figure 15:
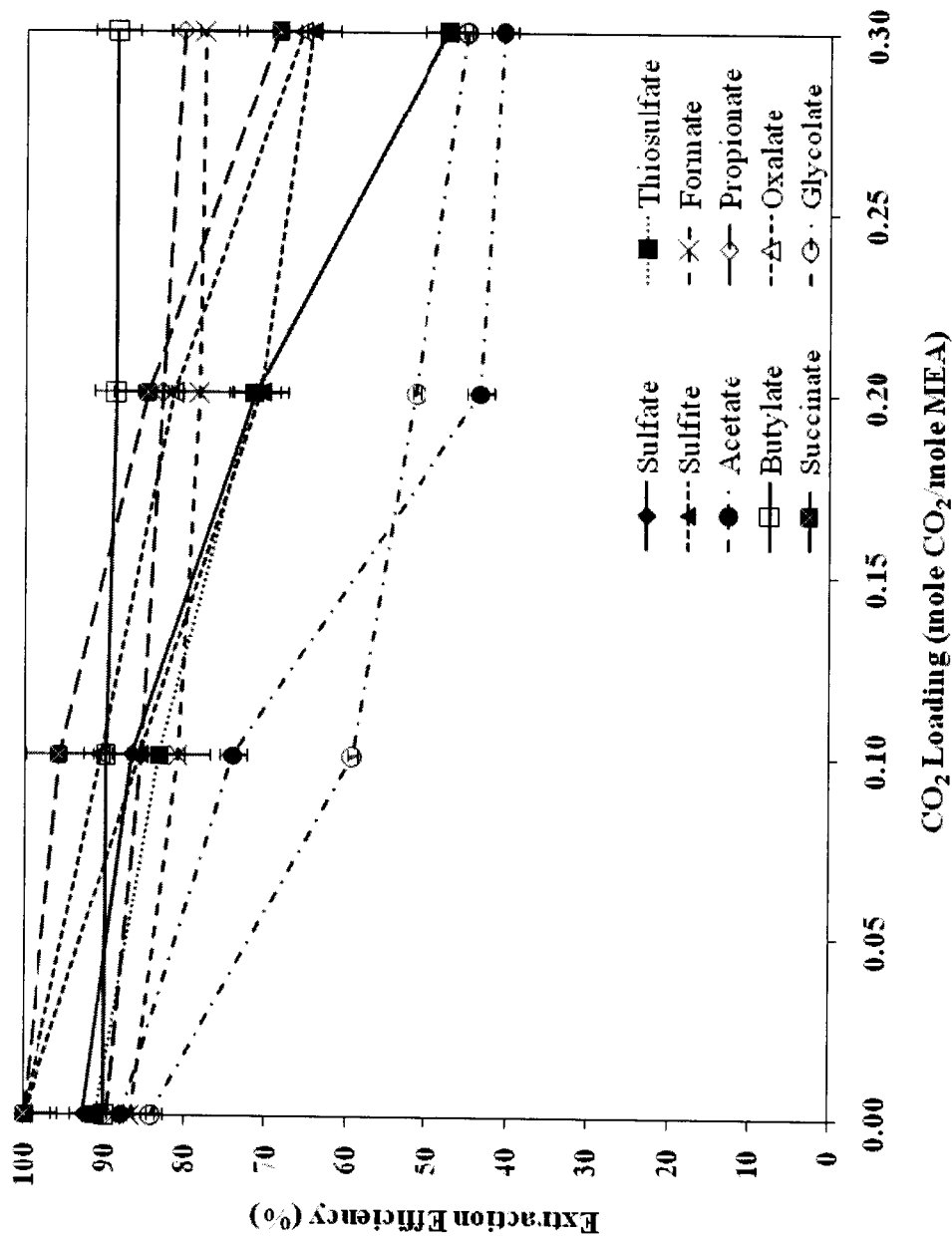
FIG. 15 is a chart showing the effects of $CO_2$ loading on the efficiency of HSS extraction from 5 kmol/m³ MEA using a 88% OH-Aliquat® combination.

The effects of CO₂ loading on efficiency of HSS extraction were determined using modified Aliquat®. Assessments of the effects of CO₂ loading were carried out with 88% conversion of modified Aliquat® at the optimum concentration of 1 kmol/m³. Room temperature and 1 to 1 phase ratio were selected for this study. FIG. 15 shows that the increase of CO₂ loading from 0 to 0.1, 0.2, and 0.3 mol/mol MEA respectively decreased the extractability of the extractant, and thus decreased the % extraction of HSS. When MEA solution was loaded with CO₂ at 0, 0.1, 0.2, and 0.3 mol/mol, its pH was reduced respectively. The decrease of pH with CO₂ loading could be used to account for the reduced HSS extraction efficiency because it made the ion-exchange mechanism less favorable. In addition to reduced pH, CO₂ in MEA solution could also introduce competitive reactions with HSS. The absorption reactions are known to generate anions such as carbonate ($CO_3^{2-}$), bicarbonate ($HCO_3^-$), and carbamate ($OHCH_2CH_2NHCOO^-$). These CO₂ induced anions potentially compete in ion-exchange mechanism for OH⁻ with HSS, thus reducing the quantity of HSS extracted into the Aliquat® phase. The effect of CO₂ indicates that the MEA stream to be extracted should be as lean as possible to minimize the undesirable competitive reactions.

Example 7

Regeneration of Used Aliquat®

In order to recycle the Aliquat® in the extraction process, regeneration of used extractant is desired. This section aims at determining the best regeneration conditions for replenishment of the used aliquat. Based on initial screening, NaOH was selected as a regenerant due to its strong basicity. HSS preloaded Aliquat® previously obtained from the extraction experiments were used throughout this section. Pre-loaded HSS concentrations in OH Aliquat® used in the regeneration study are given in Table 5. Mixing time, temperature, and volume phase ratio of used Aliquat® and NaOH are also optimized.

TABLE 5

Summary of HSS preloaded 1 kmol/m³ OH Aliquat ®

| | Concentration (ppm) | | | |
|---|---|---|---|---|
| HSS | 69% OH Aliquat | 79% Aliquat ® | 87% Aliquat | 88% Aliqua |
| Formate | 877 | 910 | 930 | 852 |
| Acetate | 845 | 771 | 920 | 825 |
| Propionate | 880 | 921 | 874 | 846 |
| Butyrate | 938 | 960 | 893 | 818 |
| Glycolate | 808 | 859 | 813 | 789 |
| Oxalate | 995 | 990 | 999 | 999 |
| Succinate | 1032 | 1019 | 955 | 999 |
| Sulfate | 924 | 961 | 911 | 864 |
| Thiosulfate | 915 | 895 | 889 | 830 |

7.1: Effect of NaOH Concentration

Figure 16:
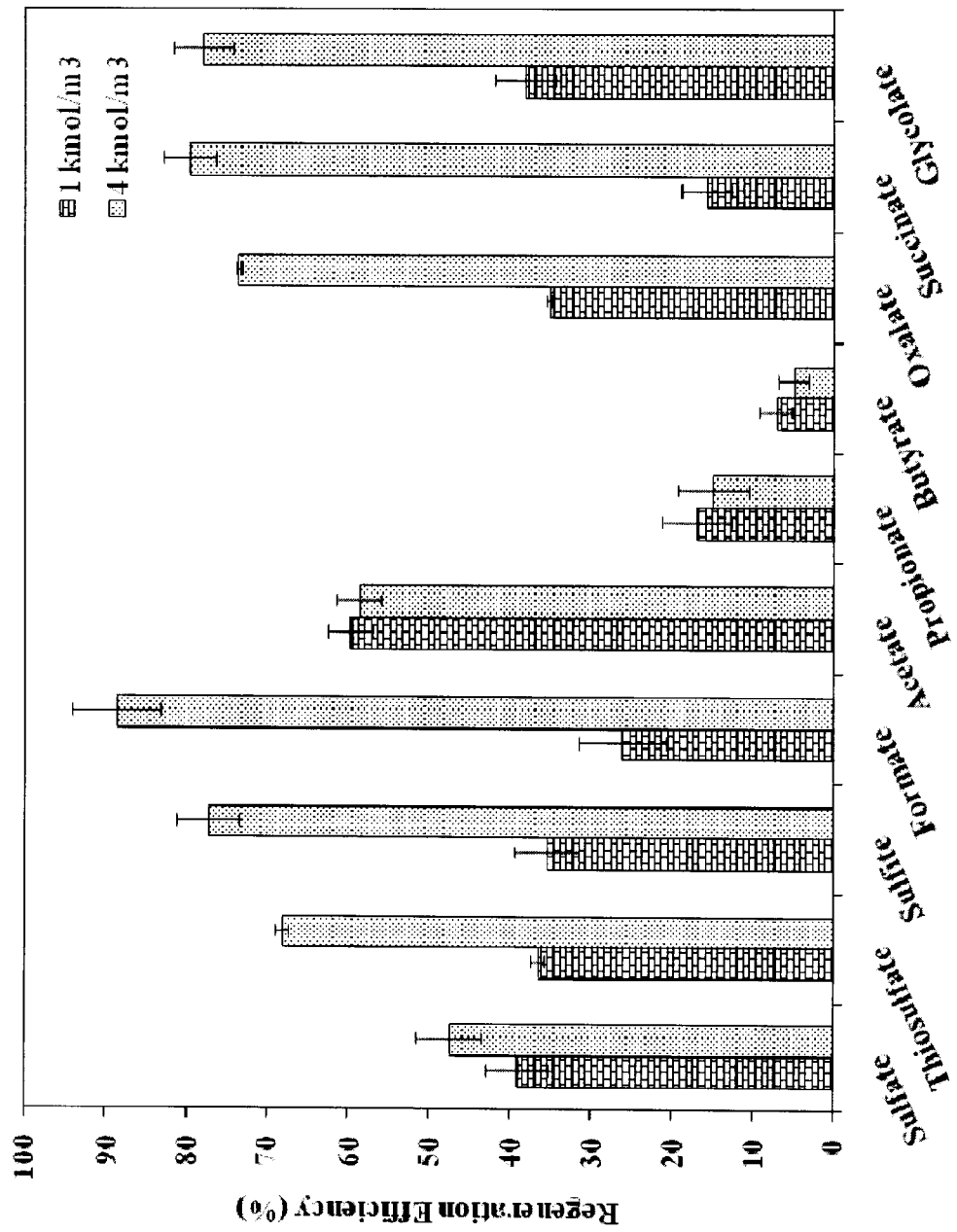
FIG. 16 is a chart showing the effects of NaOH concentration on regeneration efficiency of a 79% OH-Aliquat® combination pre-loaded with HSS.

The effect of NaOH concentration was evaluated using 1 and 4 kmol/m³ NaOH. Mixing time was set at 10 minutes, temperature was set at 316° K, and phase ratio set at 1 to 2. 79% OH Aliquat® preloaded with known concentration of HSS shown in Table 5 was used for regeneration. Regeneration efficiency was calculated based on HSS concentration released into NaOH phase after contacting with used Aliquat®. FIG. 16 shows clearly that 4 kmol/m³ NaOH was over 50% more effective than its 1 kmol/m³ counterpart. Regeneration efficiency ranging between 59% to 89% was obtained except for sulfite, propionate, and butyrate which respectively resulted in 48%, 15%, and 5% regeneration efficiencies. NaOH of 1 kmol/m³ shows only less than 39% efficiency for most HSS. A higher NaOH concentration resulted in higher OH⁻ available for Aliquat® regeneration.

7.2 Effect of Mixing Time

Figure 17:
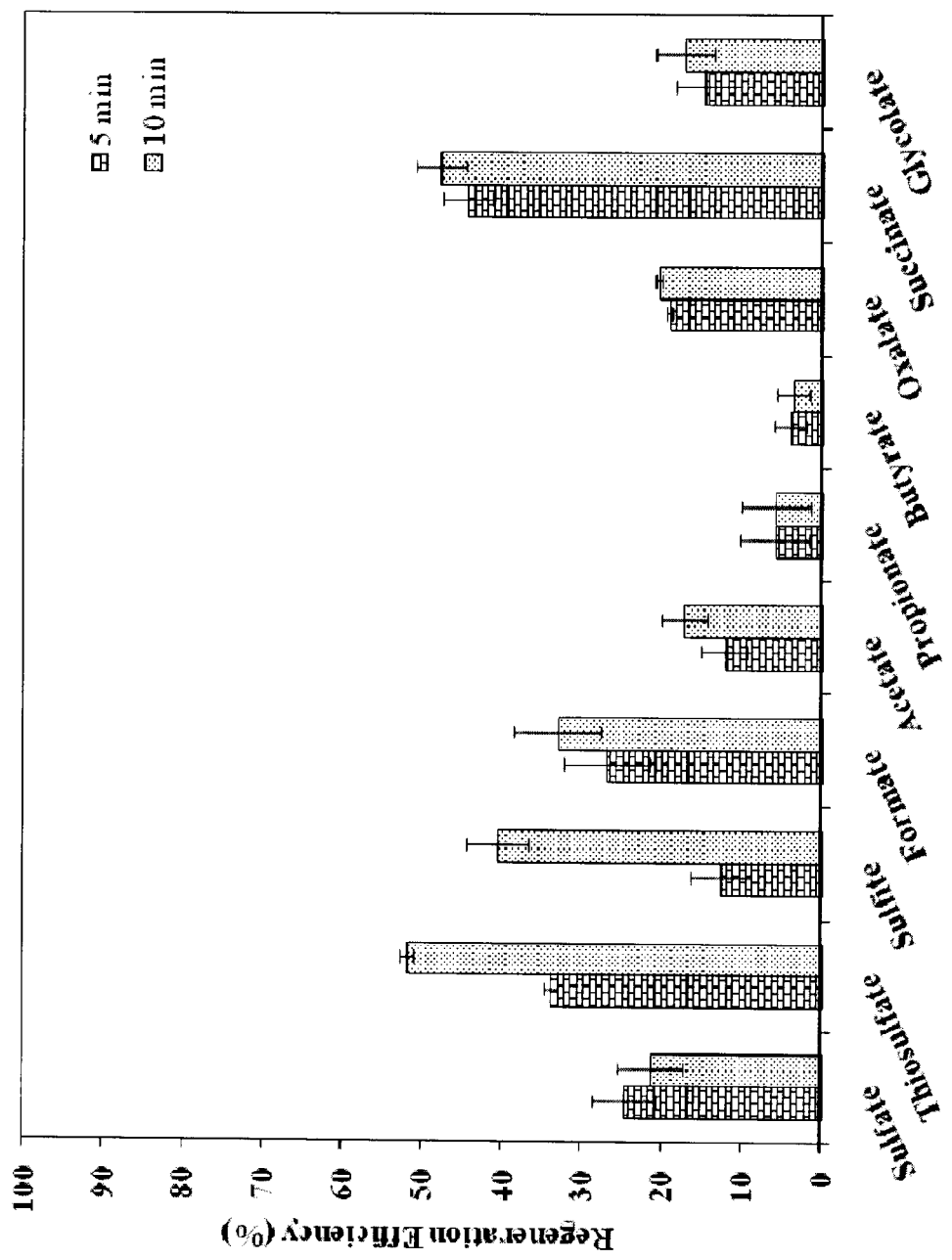
FIG. 17 is a chart showing the effects of mixing time on regeneration efficiency of a 69% OH-Aliquat® combination pre-loaded with HSS.

Mixing time also affected regeneration efficiency as shown in FIG. 17. The test was carried out using 2 mixing times of 5 and 10 minutes. NaOH concentration, temperature, and phase ratio were set at 4 kmol/m³, 298° K, and 1 to 1, respectively. Preloaded HSS 69% OH Aliquat® was used for regeneration. An increase of mixing time from 5 to 10 minutes increased the ability of the NaOH to better regenerate Aliquat®. The effect was more pronounced for thiosulate and sulfite. A longer mixing time basically provided more contact time of the ion-exchange process of HSS and OH⁻.

7.3 Effect of Temperature

Figure 18:
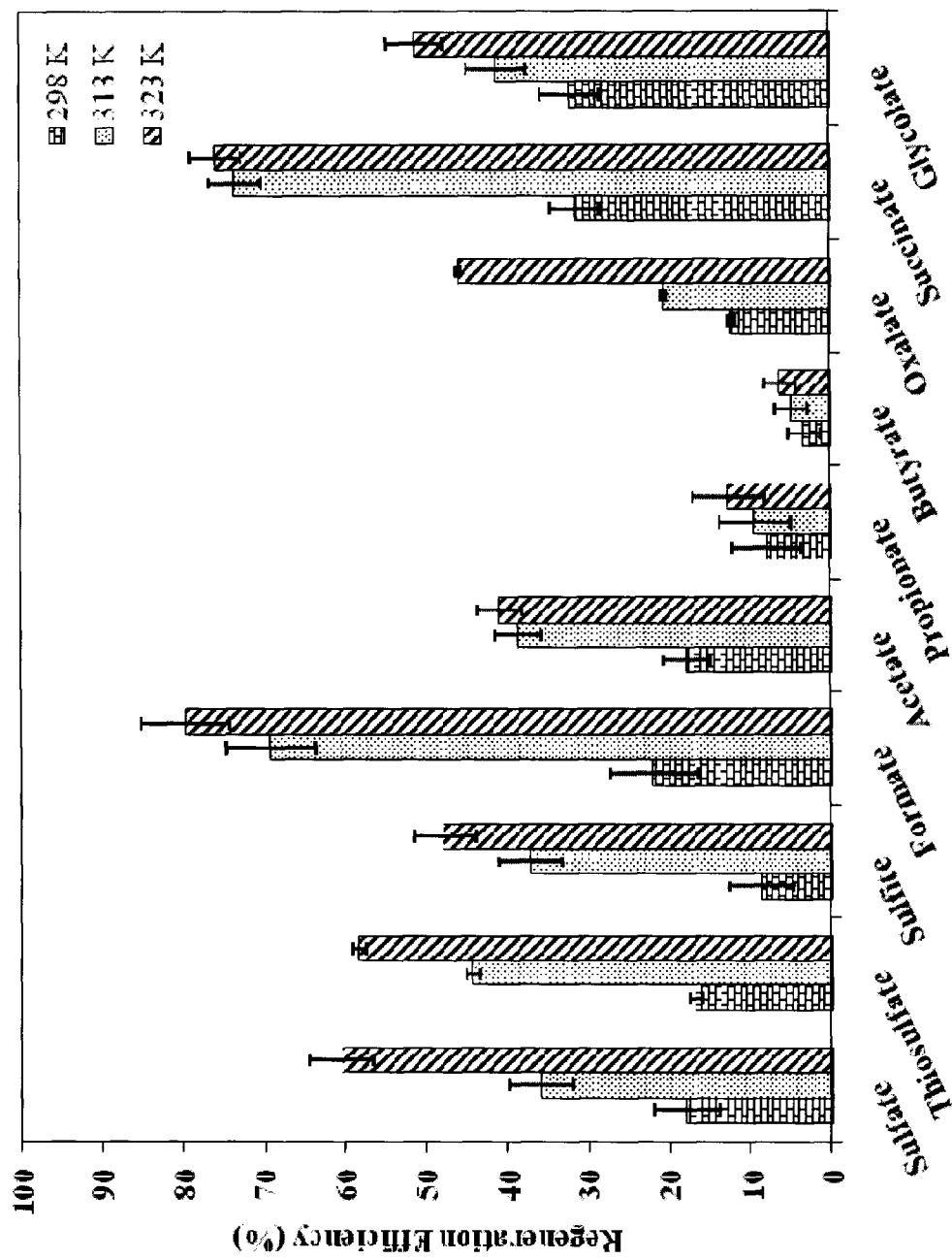
FIG. 18 is a chart showing the effects of temperature on regeneration efficiency of a 69% OH-Aliquat® combination pre-loaded with HSS.

FIG. 18 shows the effect of regeneration temperature with 4 kmol/m³ NaOH, 10 min mixing time, and 1 to 2 phase ratio. Preloaded HSS Aliquat® prepared as described in previous sections was used to study the effects of temperature. Temperatures tested were 298° K, 313° K, and 323° K. Regeneration of used Aliquat® was found to be temperature dependent. Results showed that a higher temperature was required to better regenerate the used aliquat. Regeneration was most effective using the highest temperature of 323° K showing over 50% efficiency for most HSS. Propionate and butyrate were the exceptions with only 12% and 6% efficiency. When regeneration at 313° K was used, the efficiency clearly dropped. A huge decrease was further observed when regeneration was carried out at 298° K. This indicates the endothermic nature of the regeneration process of Aliquat® using NaOH.

7.4: Effect of Phase Ratio

Figure 19:
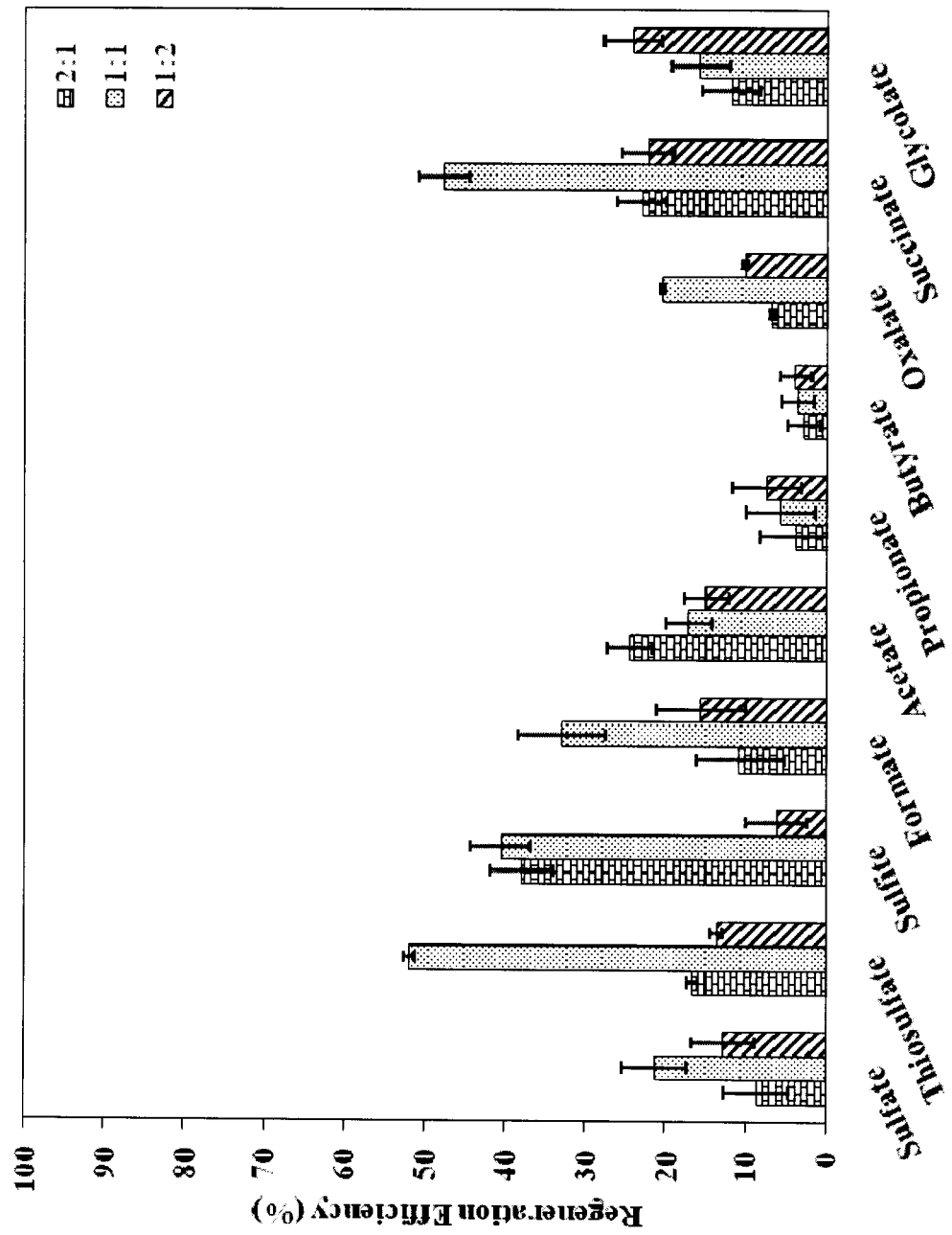
FIG. 19 is a chart showing the effects of phase ratio on regeneration efficiency a 69% OH-Aliquat® combination pre-loaded with HSS.

The optimum aliquat/NaOH phase ratio was determined using 69% OH Aliquat®, 4 kmol/m³ NaOH, 10 min mixing time, and 298° K temperature. In FIG. 19, regeneration using phase ratio of 2 to 1 shows a small range of efficiency in which most HSS was extracted back into NaOH phase by only 30%. The highest percentage that this phase ratio produced was 38% for sulfite. A further test was carried out with 1 to 1 Aliquat® to NaOH, which was found to be optimum. The reduction of Aliquat® volume showed significant improvement on regeneration efficiency of many HSS. Thiosulfate, sulfate, oxalate, formate, and succinate showed over 100% increase in terms of regeneration efficiency compared to those obtained from 2 to 1 phase ratio. Acetate was the only HSS for which the efficiency decreased with 1 to 1 phase ratio while sulfite was not affected by the phase ratio change. A test was further attempted by changing the phase ratio to 1 to 2. FIG. 19 shows that an increase of NaOH phase volume had a negative effect by reducing the regeneration efficiency of most HSS to as low as those obtained by the previous 2 to 1 volume ratio. The efficiency of sulfite and acetate were also reduced and were the lowest among volume ratio tested in this study. The only benefit of using 1 to 2 phase ratio was for glycolate in which it yielded the highest regeneration efficiency.

Figure 20:
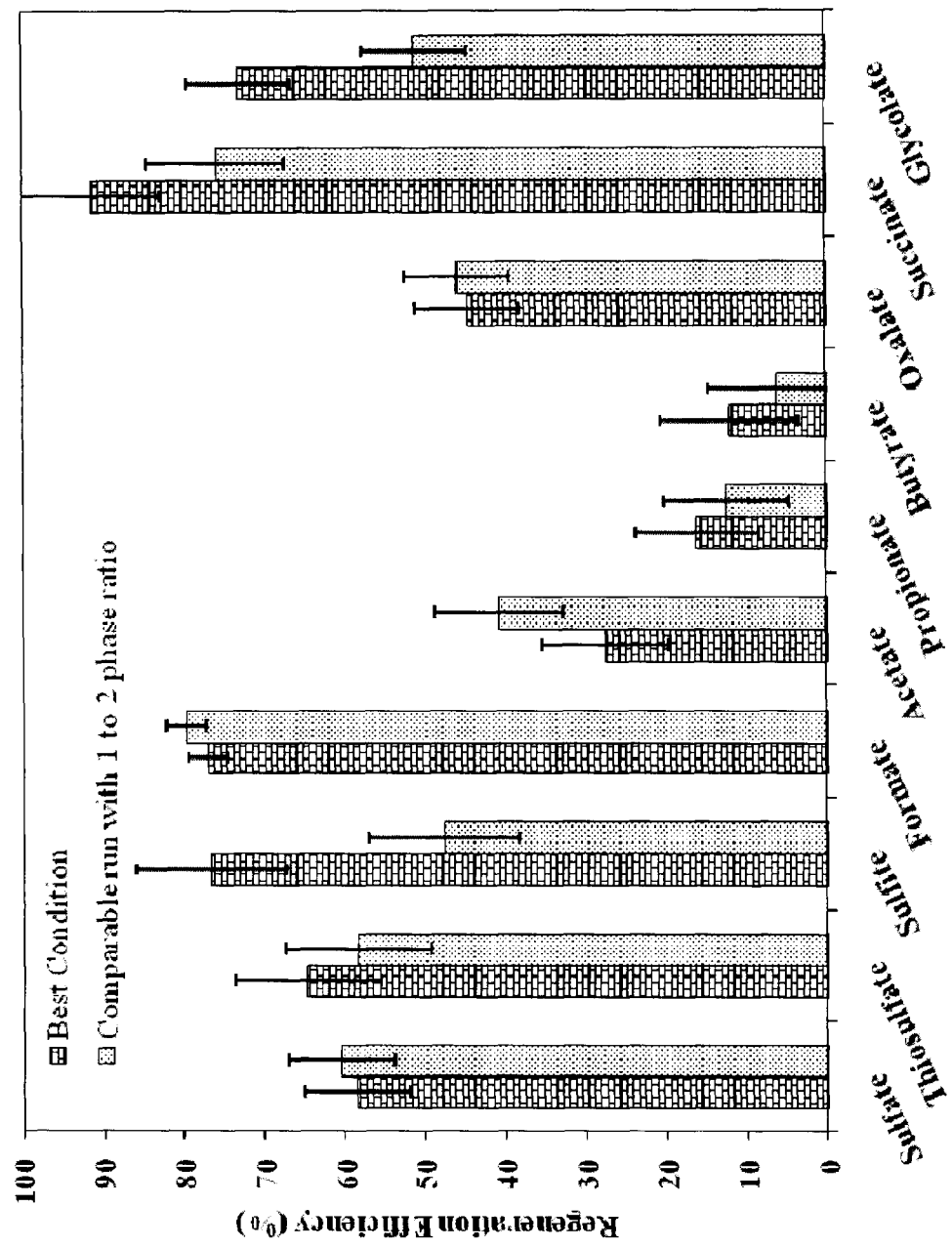
FIG. 20 is chart comparing of regeneration efficiency of a 88% OH-Aliquat® combination pre-loaded with HSS and a 69% OH-Aliquat® combination pre-loaded with HSS, using a 1:1 phase ratio and a 1:2 phase ratio.

FIG. 20 also confirms the effectiveness of 1 to 1 ratio. The regeneration efficiency was obtained also by using the optimum conditions found for the other parameters (i.e. 4 kmol/m³ NaOH, 10 min mixing time, and 323° K temperature). The 88% OH Aliquat® preloaded with HSS was used to test the optimum conditions. The result is compared with run of 1 to 2 phase ratio of 69% OH Aliquat® to NaOH. It is clear that 1 to 1 phase ratio works more effectively than the rest of the conditions.

Example 8

Extraction of Neutral Degradation Products

In addition to HSS, the extraction technique developed in this study was also applied to the extraction of neutral degradation products. 5 kmol/m³ MEA solution spiked with 1000 ppm of major degradation products of imidazole, N-(2-hydroxyethyl)acetamide, 2-oxazolidone, N-(2-hydroxyethyl)succinimide, and 1-(2-hydroxyethyl)-2-imidazolidinone was used. The extraction was carried out with 1 kmol/m³ 88% OH aliquat, 1 to 1 phase ratio of Aliquat® and aqueous amine, and room temperature. Table 6 shows concentrations of neutral degradation products in MEA solution after extraction and the corresponding % extraction efficiency. The Aliquat® also successfully extracted imidazole, 2-oxazolidone, and N-(2-hydroxyethyl)succinimide from aqueous MEA solution. Extraction efficiencies of 96%, 98%, 99% were observed for imidazole, 2-oxazolidone, and N-(2-hydroxyethyl)succinimide, respectively. N-(2-hydroxyethyl)acetamide and 1-(2-hydroxyethyl)-2-imidazolidinone were also extracted by Aliquat® with the respective efficiencies of 43% and 49%.

TABLE 6

Extraction of neutral degradation products in 5 kmol/m³ MEA solution using 1 kmol/m³ 88% OH Aliquat ® at room temperature, 10 min mixing time, and 1 to 1 phase ratio

| Degradation Products | Extraction Efficiency (%, ±5) |
|---|---|
| Imidazole | 96 |
| 2-Oxazolidone | 98 |
| N-(2-hydroxyethyl)succinimide | 99 |

TABLE 6-continued

Extraction of neutral degradation products in 5 kmol/m$^3$ MEA solution using 1 kmol/m$^3$ 88% OH Aliquat ® at room temperature, 10 min mixing time, and 1 to 1 phase ratio

| Degradation Products | Extraction Efficiency (%, ±5) |
|---|---|
| N-(2-hydroxyethyl)acetamide | 43 |
| 1-(2-hydroxyethyl)-2-imidazolidinone | 49 |

The high percentage of extraction efficiency of imidazole could possibly be because of its resonance structure. The lone pair electron delocalization of acidic nitrogen atom into the ring induces various negatively charged sites on the ring. This could be favorable to ion-exchange process with OH⁻ from aliquat. 2-oxazolidone and N-(2-hydroxyethyl)succinimide could also acquire resonance structure but giving only one negative site on the carbonyl oxygen. If this was the only site for ion-exchange process with Aliquat®. There must be other factors contributing to a very high extraction efficiency similar to that of imidazole. The ring structure could have also contributed because it was what 2-oxazolidone, and N-(2-hydroxyethyl)succinimide had in common with imidazole.

The invention claimed is:

1. A one-stage method for recovery of impurities and/or degradation products and/or heat-stable salts from spent amine-based solvents used for capture of $CO_2$ from gas streams, the method comprising:
   recovering $CO_2$ from a spent $CO_2$-enriched amine-based solvent thereby producing a lean amine-based solvent;
   contacting and mixing together the lean amine-based solvent with a reaction composition comprising a phase-change catalyst and a diluent, thereby producing a first organic phase comprising the impurities and/or degradation products and/or heat-stable salts and a first aqueous phase comprising a purified lean amine-based solvent;
   separating the first organic phase and the first aqueous phase; and
   separately recovering the first organic phase and the first aqueous phase.

2. The one-stage method of claim 1, additionally comprising a step of recycling the purified lean amine-based solvent for capturing $CO_2$ from a gas stream.

3. The one-stage method of claim 1, additionally comprising a step of regenerating the purified lean amine-based solvent.

4. The one-stage method of claim 1, wherein the phase-change catalyst is a tri-n-octylamine.

5. The one-stage method of claim 1, wherein the phase-change catalyst is a N-methyl-N,N-dioctyloctan-1-ammonium chloride wherein a portion of the chloride ions has been substituted with hydroxy ions.

6. The one-stage method of claim 5, wherein about 49% to about 95% of the chloride ions have been substituted with hydroxy ions.

7. The one-stage method of claim 1, wherein the diluent is 1-octylamine.

8. The one-stage method of claim 1, wherein the concentration of the phase-change catalyst is about 0.01 kmol/m$^3$ to about 1.5 kmol/m$^3$.

9. The one-stage method of claim 1, wherein the ratio of the phase-change catalyst to the diluent is selected from a range of about 1:2 to about 2:1.

10. The one-stage method of claim 1, wherein the reaction composition is recovered from the first organic phase comprising the impurities and/or degradation products and/or heat-stable salts, by:
    intermixing the first organic phase with a NaOH solution thereby producing a second organic phase comprising the recovered reaction composition and a second aqueous phase comprising the NaOH solution comprising the impurities and/or degradation products and/or heat-stable salts;
    separating the second organic phase and the second aqueous phase; and
    separately recovering the second organic phase and the second aqueous phase.

11. The one-stage method of claim 10, additionally comprising a step of recycling the recovered reaction composition for recovery of impurities and/or degradation products and/or heat-stable salts from a spent amine-based solvent used for capture of $CO_2$ from a gas stream.

12. The one-stage method of claim 10, additionally comprising a step of regenerating the recovered reaction composition by commingling a fresh phase-change catalyst and/or a fresh diluent therewith.

13. The one-stage method of claim 10, wherein the concentration of the NaOH solution is about 0.5 kmol/m$^3$ to about 10.0 kmol/m$^3$.

14. The one-stage method of claim 10, wherein the ratio of the first organic phase to the NaOH solution is selected from a range of about 1:2 to about 2:1.

15. A two-stage method for recovery of impurities and/or degradation products and/or heat-stable salts from spent amine-based solvents used for capture of $CO_2$ from gas streams, the method comprising:
    a first stage wherein $CO_2$ is recovered from a $CO_2$-enriched amine-based solvent thereby producing a lean amine-based solvent;
        contacting and mixing together the lean amine-based solvent with a first reaction composition comprising a mixture of 1-octylamine and N-methyl-N,N-dioctyloctan-1-ammonium chloride having a portion of its chloride ions substituted with hydroxy ions, thereby producing a third organic phase comprising the impurities and/or degradation products and/or heat-stable salts and a third aqueous phase comprising the lean amine-based solvent;
        separating the third organic phase and the third aqueous phase;
        separately recovering the third organic phase and the third aqueous phase;
    a second stage wherein the recovered third aqueous phase is contacted and intermixed with a second reaction composition comprising 1-octanol and a tri-n-octylamine to produce a fourth organic phase comprising the impurities and/or degradation products and/or HS S and a fourth aqueous phase comprising the lean amine-based solvent;
        separating the fourth organic phase and the fourth aqueous phase; and
        separately recovering the fourth organic phase and the fourth aqueous phase.

16. The two-stage method of claim 15, additionally comprising a step of recycling the purified lean amine-based solvent for capturing $CO_2$ from a gas stream.

17. The two-stage method of claim 15, additionally comprising a step of regenerating the purified lean amine-based solvent.

18. The two-stage method of claim 15, additionally comprising steps for recovering and purifying the first reaction composition from the third organic phase.

19. The two-stage method of claim 15, additionally comprising steps for recovering and purifying the second reaction composition from the fourth organic phase.

* * * * *